(12) United States Patent
Arai et al.

(10) Patent No.: US 8,387,224 B2
(45) Date of Patent: Mar. 5, 2013

(54) DEVICE AND METHOD FOR MEASURING AND MACHINING SPECTACLE LENS, SPECTACLE LENS MANUFACTURING METHOD, AND SPECTACLES MANUFACTURING METHOD

(75) Inventors: Michio Arai, Tokyo (JP); Masashi Nishioka, Tokyo (JP)

(73) Assignee: Hoya Corporation, Shinjuku-ku, Tokyo (JP)

( * ) Notice: Subject to any disclaimer, the term of this patent is extended or adjusted under 35 U.S.C. 154(b) by 1146 days.

(21) Appl. No.: 11/665,060

(22) PCT Filed: Oct. 25, 2005

(86) PCT No.: PCT/JP2005/019599
§ 371 (c)(1), (2), (4) Date: Nov. 14, 2008

(87) PCT Pub. No.: WO2006/046558
PCT Pub. Date: May 4, 2006

(65) Prior Publication Data
US 2009/0067940 A1 Mar. 12, 2009

(30) Foreign Application Priority Data
Oct. 25, 2004 (JP) ................................ 2004-309364

(51) Int. Cl.
*B23Q 17/00* (2006.01)
*B23B 51/08* (2006.01)
*C01B 5/00* (2006.01)

(52) U.S. Cl. .................. 29/407.05; 408/22; 33/700
(58) Field of Classification Search .............. 408/22, 408/1 R; 33/700, 28, 200; 351/178; 451/42; 29/406, 407.5, 407.09
See application file for complete search history.

(56) References Cited

U.S. PATENT DOCUMENTS
6,263,583 B1 * 7/2001 Mizuno ............................ 33/28
2004/0058624 A1 * 3/2004 Suzuki et al. ................... 451/42

FOREIGN PATENT DOCUMENTS
| JP | 07-230062 | 8/1995 |
| JP | 11-048114 | 2/1999 |
| JP | 2000-343395 | 12/2000 |
| JP | 2001-050738 | 2/2001 |
| JP | 2001-157957 | 6/2001 |
| JP | 2002-014303 | 1/2002 |
| JP | 2003-172618 | 6/2003 |
| JP | 2003-295134 | 10/2003 |
| JP | 2004-004826 | 1/2004 |
| JP | 2004-106147 | 4/2004 |

* cited by examiner

*Primary Examiner* — John C Hong
(74) *Attorney, Agent, or Firm* — Flynn, Thiel, Boutell & Tanis, P.C.

(57) ABSTRACT

A mounting part for mounting spectacle frame components such as lugs can be machined after confirming that a lens thickness at a mounting part-machined portion where the mounting part is machined is equal to or larger than the specified value, and can be installed the spectacle lens components on the spectacle lens with a requested strength. The device, the method for the above, a spectacle lens manufacturing method, and a spectacles manufacturing method are given. The spectacle lens (1) is fed to a lens thickness measuring device (70) by a lens feeder. The fed amount of the spectacle lens in this feeding is based on the measured results of a distance between a frame center forming a block center by a lens holder in an edging for manufacturing the spectacle lens (1) from a raw material lens and the edge face of the spectacle lens (1) where the mounting part is to be machined. The thickness of the lens at the mounting part-machined portion can be accurately measured by the measuring device (70) even if an error produced in the edging is included in the distance.

13 Claims, 11 Drawing Sheets

(A)

(B)

DEVICE AND METHOD FOR MEASURING AND MACHINING SPECTACLE LENS, SPECTACLE LENS MANUFACTURING METHOD, AND SPECTACLES MANUFACTURING METHOD

TECHNICAL FIELD

The present invention relates to a measuring and machining device used for machining a mounting part for mounting spectacle frame components such as lugs to a spectacle lens, a method of measuring and machining thereof, and a spectacle lens manufacturing method and a spectacles manufacturing method using the measuring and machining method, and is applicable to a spectacle lens to be mounted to a rimless spectacle frame.

BACKGROUND ART

Regarding a plastic spectacle lens to be installed in a spectacle frame, when a lens blank manufactured by a casting method or the like has a surface not to be optically finished, various surface treatment are performed after this surface is optically finished by cutting and polishing, and the lens is manufactured by edging the lens thus obtained to the specified lens shape requested by a spectacle wearer. Note that a lens before edging is expressed as a "raw material lens" in this specification and an edging-processed lens is expressed as a "spectacle lens".

In order to install the spectacle lens in a rimless spectacle frame, a technology shown by the following Patent Document 1 discloses that a closed-end hole extending from the edge face of the spectacle lens toward the inside of the lens within the thickness range of the spectacle lens is formed in the spectacle lens by a drill. A pin-shaped protrusion is provided on a spectacle frame component such as a lug, the protrusion is inserted into the closed-end hole being a mounting part for installing spectacle frame members in the spectacle lens, and the protrusion is fixed to the closed-end hole with an adhesive. In the technology shown in the following Patent Document 2, a notched part having an aperture at least on one surface side out of both surface sides of the spectacle lens is formed on the spectacle lens from a lens edge face toward the inside of the lens with a cutter. On the spectacle frame component such as a lug, provided is an insertion capable of being inserted into the above notched part serving as a mounting part for installing the frame member. The insertion inserted into the notched part is fixed with an adhesive.

Patent Document 1: Japanese Patent Application Laid-open No. Hei 7-230062
Patent Document 2: Japanese Patent Application Laid-open No. 2002-14303

DISCLOSURE OF INVENTION

Since the above-described mounting part composed of the closed-end hole and notched part is formed near the edge face (so-called koba (edge) in Japanese) of a spectacle lens, in order to attach spectacle frame components such as lugs on the spectacle lens by this mounting part with required high strength, the lens thickness at a mounting part-machined portion where the mounting part is machined with the above-described drill or cutter is required to be equal to or lager than the specified value.

In the meantime, when a spectacle lens having the specified lens shape is manufactured by edging a raw material lens, the raw material lens is edged while a frame center of the raw material lens forms a block center by a lens holding tool such as a lens holder or the like. However, it happens sometimes that a spectacle lens manufactured by edging is completed as if a position shifted from the frame center were the frame center due to a machining error produced in the edging.

In such a case, a distance between the frame center forming the block center at the edging and the edge face of an actual spectacle lens where the mounting part is to be machined differs from a design-specified original distance, and becomes a distance including the error.

When the optical surface of a spectacle lens is cut and polished at the stage of a raw material lens as described above, the cutting-and-polishing is conducted lest the lens thickness at the lens edge face at the stage of a spectacle lens should be equal to or less than the allowable minimum thickness. However, a lens having a thickness equal to or less than the minimum thickness may be produced in some rare cases. In addition, a spectacle lens having a dioptric power varies in lens thickness from the edge face toward the lens center.

Accordingly, as described above, when the distance between the frame center forming the block center at the edging and the edge face of an actual spectacle lens where the mounting part is to be machined differs from the design-specified original distance, the above-described factor may make the lens thickness at the machined portion of the above-described mounting part where the above-described mounting part is to be machined by a drill or a cutter be equal to or less than the specified value. In such a case, it becomes difficult to mount the spectacle frame components on the spectacle lens with a requested strength.

An object of the present invention is: to provide a device and a method for measuring and machining a spectacle lens capable of machining a mounting part after confirming that a lens thickness at a mounting part-machined portion where the mounting part is machined is equal to or larger than the specified value, and capable of installing the spectacle lens components on the spectacle lens with a requested strength, and to provide a spectacle lens manufacturing method and a spectacles manufacturing method to which the method for measuring and machining the spectacle lens is applied.

The spectacle lens measuring and machining device relating to the present invention includes: a distance measuring device for measuring a distance between a frame center forming a block center in an edging for manufacturing the spectacle lens from a raw material lens and the edge face of the spectacle lens, including an error produced in the edging; a lens thickness measuring device for measuring the lens thickness at a mounting part-machined portion in the spectacle lens where the mounting part for mounting spectacle frame components is machined; a lens feeder for feeding the spectacle lens to the lens thickness measuring device; a machining device including a machining tool which advances from the edge face of the spectacle lens toward the inside of the lens, and for machining the above-described mounting part to the spectacle lens with the machining tool; a controller for controlling the above-described lens feeder and the above-described machining device, to control feeding of the spectacle lens to the above-described lens thickness measuring device by the above-described lens feeder based on data on the above-described distance which is inputted from the above-described distance measuring device, and not to drive the machining device when data on the lens thickness is inputted from the lens thickness measuring device and the lens thickness is found to be less than the specified value, and to drive the machining device when the lens thickness is equal to or larger than the specified value.

A method for measuring and machining a spectacle lens relating to the present invention includes the steps of: edging for manufacturing the spectacle lens having the specified lens shape by edging a raw material lens taking a position to be a frame center as a block center; distance-measuring for measuring the distance between the frame center of the spectacle lens manufactured from the raw material lens by the edging step and an edge face of the spectacle lens; calculating a frame center deviation amount for calculating the position of an actual frame center based on the measured results by the distance measuring step to calculate a deviation amount of the actual frame center from the designed frame center; lens feeding for feeding the spectacle lens to a lens thickness measuring device for measuring the lens thickness at a mounting part-machined portion where the mounting part for installing spectacle frame components for the spectacle lens is to be machined, while correcting the above-described deviation amount obtained in the frame center deviation amount calculating step; lens thickness measuring for measuring the lens thickness at the mounting part-machined portion of the spectacle lens with the above-described lens thickness measuring device; and machining a mounting part for machining the mounting part in the spectacle lens with the machining tool when the lens thickness obtained by the lens thickness measuring step is equal to or larger than the specified value, and for not machining the mounting part in the spectacle lens with a machining tool when the lens thickness obtained by the lens thickness measuring step is less than the specified value.

In addition, a method for manufacturing a spectacle lens relating to the present invention includes the steps of: edging for manufacturing the spectacle lens having the specified lens shape by edging a raw material lens taking a position to be a frame center as a block center; distance measuring for measuring the distance between the frame center of the spectacle lens manufactured from the raw material lens by the edging step and an edge face of the spectacle lens; calculating a frame center displacement amount for calculating an actual position of the frame center based on the measured results by the distance measuring step so that a displacement amount between the actual frame center and the designed frame center is calculated; lens feeding for feeding the spectacle lens to a lens thickness measuring device for measuring the lens thickness at a mounting part-machined portion where the mounting part for mounting spectacle frame components in the spectacle lens is machined while correcting the above-described displacement amount obtained in the frame center displacement amount calculating step; lens thickness measuring for measuring the lens thickness at the mounting part-machined portion in the spectacle lens with the above-described lens thickness measuring device; and mounting part machining for machining the mounting part on the spectacle lens with a machining tool when the lens thickness obtained by this lens thickness measuring step is equal to or larger than the specified value.

In addition, a method for manufacturing a spectacle lens relating to the present invention includes the steps of: edging for manufacturing the spectacle lens having the specified lens shape by edging a raw material lens taking a position to be a frame center as a block center; distance measuring for measuring the distance between the frame center of the spectacle lens manufactured from the raw material lens by the edging step and an edge face of the spectacle lens; calculating a frame center displacement amount for calculating the position of an actual frame center based on the measured results by the distance measuring step to calculate a displacement amount between the actual frame center and the designed frame center; lens feeding for feeding the spectacle lens to a lens thickness measuring device for measuring the lens thickness at a mounting part-machined portion where the mounting part for mounting spectacle frame components in the spectacle lens is machined while correcting the above-described displacement amount obtained in the frame center displacement amount calculating step; lens thickness measuring for measuring the lens thickness at the mounting part-machined portion in the spectacle lens with the above-described lens thickness measuring device; mounting part machining for machining the mounting part on the spectacle lens with a machining tool when a lens thickness determined in this lens thickness measuring step is equal to or larger than the specified value, and mounting for mounting the spectacle frame components on the mounting part machined in the mounting part-machining step.

Accordingly, in the present invention, even if an error is produced in a distance from a frame center forming a block center to an edge face of a spectacle lens where the mounting part is to be machined at the time of manufacturing a spectacle lens getting the specified lens shape by edging a raw material lens, when the spectacle lens is fed to a lens thickness measuring device for measuring the lens thickness at a mounting part-machined portion where the mounting part is machined in the spectacle lens, the fed amount in this feeding is that including the above-described error, which makes it possible to measure a lens thickness at a mounting part machined portion where the above described mounting part is actually machined in the spectacle lens by the above-described lens thickness measuring device.

In the present invention, when the lens thickness at the mounting part-machined portion is less than the specified value, machining of the above-described mounting part in this spectacle lens with the machining tool is not performed, and when the lens thickness at the mounting part-machined portion is equal to or larger than the above-described specified value, machining of the above-described mounting part in this spectacle lens with the above-described machining tool is performed.

Therefore, according to the present invention, it is possible to machine a mounting part after confirming that the lens thickness at a mounting part-machined portion where the mounting part is machined is equal to or larger than the specified value in a spectacle lens, which makes it possible to mount a spectacle frame components on the spectacle lens with a requested strength.

In the present invention above, the above-described lens feeder preferably includes a horizontal displacement device for displacing a spectacle lens having a fixed installation height in a horizontal direction, and a rotation device for rotating it around a vertical shaft.

Using this device, even when a plurality of the above-described mounting parts are provided in the peripheral direction of a spectacle lens separately from each other, measuring the lens thickness at a mounting part-machined portion where these mounting parts are to be machined by the above-described lens thickness measuring device and machining the mounting part by the above-described machining device can be conducted as specified by driving these horizontal displacement device and rotation device.

In addition, the above-described machining tool may be for machining the above-described mounting part in an optional form to a spectacle lens. One of the examples of the machining tool is a drill for forming a closed-end hole to be the mounting part from an edge face of the spectacle lens toward the inside of the lens within the thickness range of the spectacle lens. Another example of the machining tool is a cutter for forming a notched part to be the mounting part from an edge face of the spectacle lens toward the inside of the lens, making an aperture at least on one surface side out of both lens surface of the spectacle lens.

Furthermore, it is preferable that the machining tools to be used as the above-described machining tool is not limited to only one, but includes a plurality of the machining tools of different types, and the above-described machining devices are prepared for these respective machining tools.

When taking such a structure, mounting parts different in type can be machined to respective spectacle lenses by putting these machining tools to each proper use, which makes it possible to machine the mounting part in the requested type for the spectacle lens to each lens. Accordingly, the device relating to the present invention is a device versatile to various mounting parts.

As above, when a plurality of machining tools different in type are provided, these machining tools may include a drill for forming a closed-end hole to be a mounting part from an edge face of the spectacle lens toward the inside of the lens within the thickness range of the spectacle lens, and a cutter for forming a notched part to be the above-described mounting part from an edge face of the spectacle lens toward the inside of a lens, making an aperture at least on one surface side out of both lens surfaces of the spectacle lens.

In both cases where the number of machining tools is one, and where the plural machine tools different in type are provided, it is preferable that the attitude angle(s) of the machining tool(s) to the spectacle lens be set at a fixed angle and the height of the machining tool(s) be variable.

By this setting, since it becomes unnecessary to provide a means for modifying the attitude of the spectacle lens to the lens feeder, the structure of the lens feeder can be simplified. At the same time, as described above, even when the actual height of the lens edge face where the mounting part is to be machined is different from the designed height due to errors produced in a distance between the frame center forming a block center and the lens edge face where the mounting part is to be machined, it is possible to cope with such an actual height of the lens edge face by modifying the height of the machining tool.

Furthermore, modification of the height of the machining tool into the height corresponding to the actual height of the lens edge face can be performed by inputting data on the thickness of a lens measured by the above-described lens thickness measuring device in the above-described controller and adjusting the height of the machining tool through drive-controlling of the machining device by this controller.

In addition, it is preferable to perform the feeding of a spectacle lens to the lens thickness measuring device using the lens feeder under control of the above-described control device based on the deviation amount of the actual frame center from the designed frame center, which is calculated based on the measured results of the above-described distance measuring device.

According to this structure, it becomes easy to perform the calculation necessary to feed a spectacle lens to the lens thickness measuring device by the lens feeder.

A lens holder for installing a raw material lens on the edging device is mounted at a frame center of an optical surface of the raw material lens. It is preferable for the lens holder to be used for installing the spectacle lens on the above-described distance measuring device and the above-described lens feeder without being removed.

According to this structure, installing of a spectacle lens on the edging device, the distance measuring device, and the lens feeder can be conducted accurately based on the same position where the lens holder is fixed to the spectacle lens as a reference position, which makes it possible to perform measuring of the lens thickness or machining of the mounting part at an accurate position.

Effect of the Invention

According to the present invention, obtained is an effect of being capable of installing the spectacle lens components on the spectacle lens with a requested strength because the mounting part can be machined after confirming that a lens thickness at a mounting part-machined portion where the mounting part for mounting spectacle frame components such as lugs is equal to or larger than the specified value.

EXPLANATION OF SYMBOLS

W RAW MATERIAL LENS
1, 1A, 1B SPECTACLE LENS
4 EDGE FACE OF SPECTACLE LENS
10 MOUNTING PART
10A CLOSED-END HOLE AS MOUNTING PART
10B NOTCHED PART AS MOUNTING PART
20, 30 RIMLESS SPECTACLE FRAME
21, 31 LUG AS SPECTACLE FRAME COMPONENT
22 BRIDGE AS SPECTACLE FRAME COMPONENT
40 EDGING DEVICE
41 LENS HOLDING TOOL FOR EDGING DEVICE
42 LENS HOLDER
44 HOLDER RECEPTOR
50 DISTANCE MEASURING DEVICE
51 LENS HOLDING TOOL FOR DISTANCE MEASURING DEVICE
54 HOLDER RECEPTOR
60 MOUNTING PART-MACHINING DEVICE
70 LENS THICKNESS MEASURING DEVICE
90 FIRST MACHINING DEVICE FOR MACHINING CLOSED-END HOLE AS MOUNTING PART ON SPECTACLE LENS
110 SECOND MACHINING DEVICE FOR MACHINING NOTCHED PART AS MOUNTING PART ON SPECTACLE LENS
130 LENS FEEDER
130A HORIZONTAL DISPLACEMENT DEVICE
141 LENS HOLING TOOL FOR LENS FEEDER
144 HOLDER RECEPTOR
150 ROTATION DEVICE AS ROTATION EQUIPMENT
160 CONTROLLER
200 MACHINING TOOL
200A DRILL AS MACHINING TOOL
200B CUTTER AS MACHINING TOOL
FC FRAME CENTER

BEST MODE FOR CARRYING OUT THE INVENTION

Figure 1:
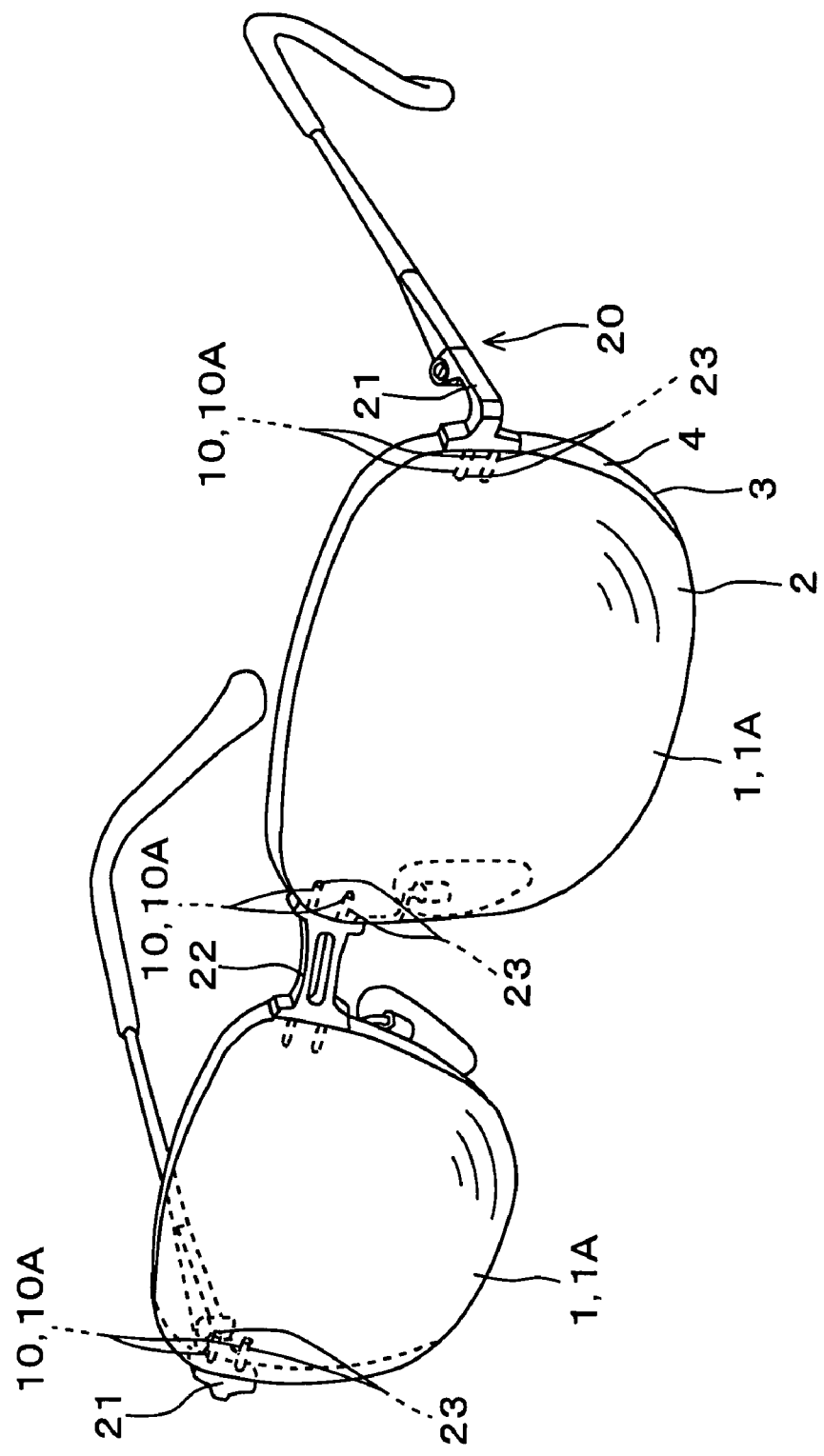
FIG. 1 is a perspective view showing the whole of spectacles adopting a rimless spectacle frame.
Figure 2:
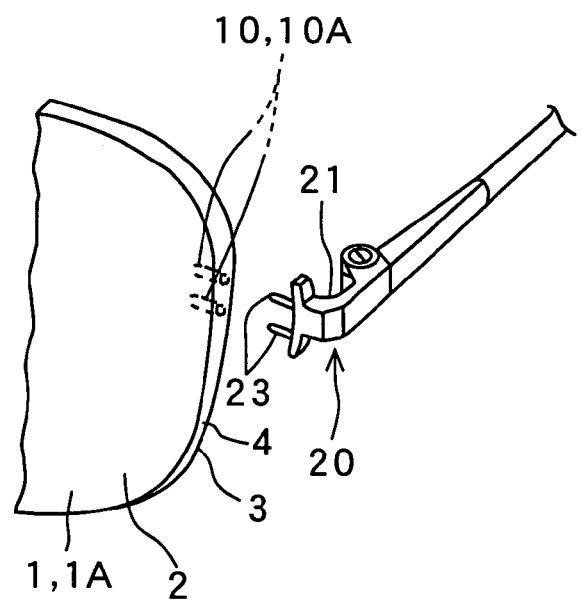
FIG. 2 is a view showing a structure to fix a lug being a component of the rimless spectacle frame in FIG. 1 to a spectacle lens, the view being a perspective view showing prior to the fixing.
Figure 3:
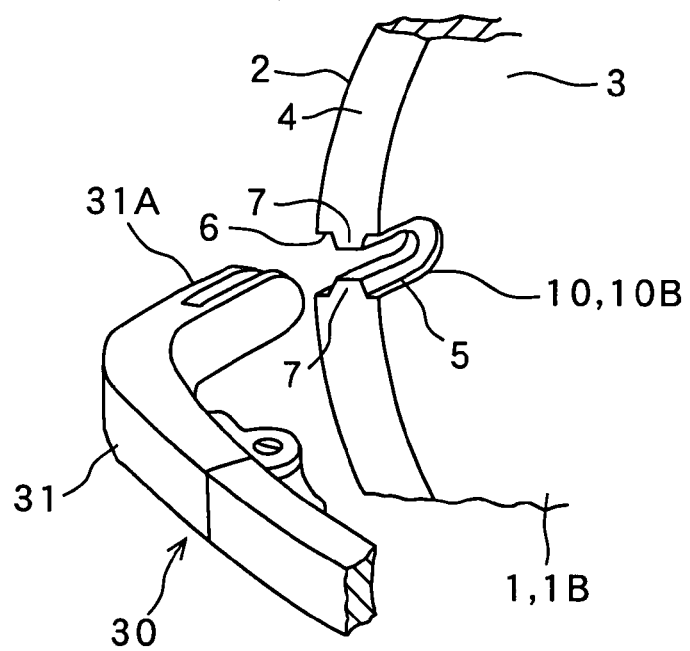
FIG. 3 is a view showing a structure to fix a lug being a component of another type rimless spectacle frame different from that in FIGS. 1 and 2 on a spectacle lens, the view showing in a similar manner to FIG. 2.

Embodiments for performing the present invention will be explained based on the drawings below. FIGS. 1, 2, and 3 show a plastic spectacle lens 1, in which a mounting part 10 is machined by a spectacle lens measuring and machining device relating to the present embodiment. The spectacle lens 1 is a meniscus lens, in which one optical surface is a convex face 2 and the other optical surface is a concave face 3, and the edge face 4 of the spectacle lens 1 is edged by an edging device which will be described later, which ensure that the spectacle lens 1 is of the specified lens shape.

There are a spectacle lens 1A shown in FIG. 2 and a spectacle lens 1B shown in FIG. 3 in the spectacle lens 1. The mounting part 10 of the spectacle lens 1A in FIG. 2 is a closed-end hole 10A extending from the edge face 4 of the spectacle lens 1A toward the inside of the lens within the lens thickness range, and the mounting part 10 in FIG. 3 is a notched part 10B extending from the edge face 4 of the spectacle lens 1B toward the inside of the lens. At the same time, the notched part 10B has an aperture at least on one face side out of the convex face 2 and the concave face 3 of the spectacle lens 1A, in the present embodiment, on both faces 2 and 3 sides of the lens. In other words, the notched part 10B of the present embodiment is a passing-through type penetrating through both lens faces 2 and 3. A ridge-shaped protrusion part 7 extending toward the inside of the lens is formed on the inside wall surfaces 5 and 6 of the notched part 10B, which are opposed to each other.

FIG. 1 shows spectacles of which lens 1A in FIG. 2 is installed in a rimless spectacle frame 20 which is a three-piece spectacle frame. Respective two pieces of pin-shaped protrusions 23 are provided on a lug 21 and a bridge 22 which are components of the spectacle frame 20, in other words, the spectacle frame components 21 and 22. Respective two pieces of the above-described closed-end holes 10A are formed (refer to FIG. 2) at portions where the lug 21 and the bridge 22 are installed on the spectacle lens 1A. The lug 21 and the bridge 22 are fixed to the lens 1A by the protrusions 23 and an adhesive by inserting the protrusions 23 into these closed-end holes 10A filled with the adhesive.

A bifurcate-shaped inserting part 31A inserted into the notched part 10B is formed on a lug 31 of a rimless spectacle frame 30 which is a three-piece spectacle frame to be used for the spectacle lens 1B in FIG. 3. The lug 31 together with the inserting part 31A are fixed on the spectacle lens 1B with the adhesive by inserting the inserting part 31A having a tier-shaped portion corresponding to the ridge-shaped protrusion 7 in the inside thereof, into the notched part 10B coated with the adhesive. The bridge of the rimless spectacle frame 30 (not shown in FIG. 3) is also fixed to the notched part formed at a bridge mounting portion of the spectacle lens 1B similarly to the lug 31.

Figure 4:
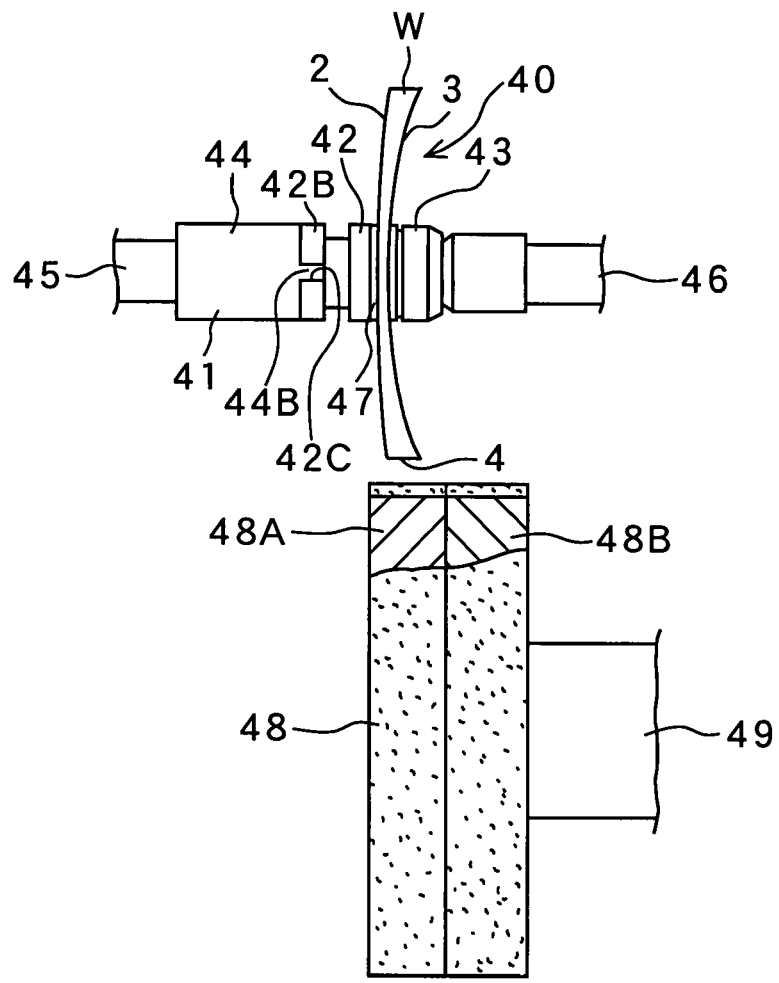
FIG. 4 is a view showing the principal portion of an edging device for manufacturing a spectacle lens having the specified lens shape by edging a raw material lens.

FIG. 4 shows a principal portion of an edging device 40. The device is for forming the spectacle lens 1 having the specified lens shape by edging from a circular raw material lens W (refer to FIG. 7 also) having an optically finished surface. The raw material lens W is manufactured by a casting method, an injection molding method, or the like. The edging device 40 has a lens holding tool 41 for holding the raw material lens W. The lens holding tool 41 includes a lens holder 42 installed on the convex face 2 side of the raw material lens W in advance, a lens pusher 43 disposed on the concave face 3 side, and a holder receptor 44 in which the lens holder 42 is detachably installed. The holder receptor 44 is connected to the tip of a first rotary shaft 45. The lens pusher 43 is connected to the tip of a second rotary shaft 46 coaxially and opposedly disposed to the first rotary shaft 45.

Figure 5:
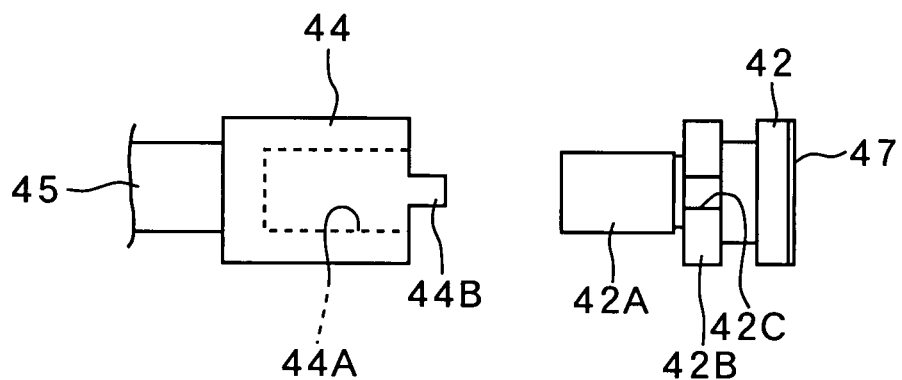
FIG. 5 is a view showing a state at the time when a lens holder and a holder receptor composing a lens holding tool shown in FIG. 4, are separated.

As shown in FIG. 5 where the lens holder 42 and the holder receptor 44 are separated from each other, the holder receptor 44 is provided with a hole 44A into which a circular sectional main body 42A of the lens holder 42 is inserted, and at the front-end of the holder receptor 44, the protrusion 44B protruded forward from a point in the circumferential direction is formed. In addition, the ring-shaped lens holder 42 is provided with a circularly embanked portion 42B, and a groove 42C into which the protrusion 44B can be inserted is formed at a portion in the circumferential direction of the circularly embanked portion 42A.

An adhesive tape 47 coated with an adhesive on both surfaces is provided at the tip face of the lens holder 42, and the lens holder 42 when separated from the holder receptor 44 is fixed to the raw material lens W with the above-described adhesive tape 47 prior to edging. The fixing (blocking) of the lens holder 42 to the raw material lens W is conducted at a later-described specified position of the raw material lens using a lens holder installing device (blocker) though not shown in FIG. 4. When the second rotary shaft 46 in FIG. 4 is at the receded position toward right in FIG. 4 by a displacement mechanism (not shown), the lens holder 42 is installed in the holder receptor 44 by inserting the main body 42A of the lens holder 42 into the hole 44A of the holder receptor 44. The lens holder 42 and the raw material lens W are positioned in the rotational direction of the first and second rotary shafts 45, 46 with respect to the holder receptor 44 by insertion of the protrusion 44B into the groove 42C.

After installing the lens holder 42 in the holder receptor 44, the second rotary shaft 46 displaces toward the lens holder 42 side by the displacement mechanism, and the raw material lens W attached by the lens holder 42 is held by the holder receptor 44 and the lens pusher 43, which are components of the above-described lens holding tool 41.

Figure 7:
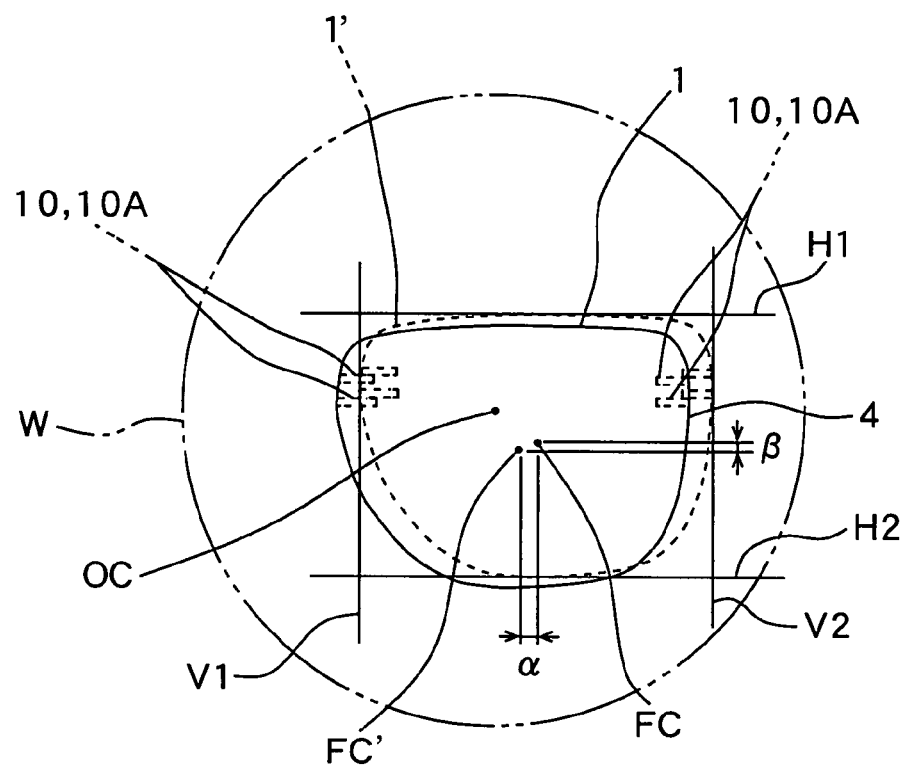
FIG. 7 is a view showing a positional relation among the raw material lens, the frame center, and the spectacle lens manufactured by edging the raw material lens.

The position (block center) where the lens holder 42 is attached on the raw material lens W is a frame center FC shown in FIG. 7. The frame center FC is a center of a square surrounded by horizontal lines H1, H2 which are tangent to the upper and the lower ends of an original spectacle lens 1' which should be manufactured from the raw material lens W by edging and vertical lines V1, V2 which are tangent to the right and the left ends of the original spectacle lens 1'. Note that "OC" in FIG. 7 is an optical center of the raw material lens W, in other words, the spectacle lens.

The position of the frame center FC in the raw material lens W is calculated based on a design value prepared in advance and stored in a storage means of a computer which will be described later. The installation of the lens holder 42 to the position is conducted by the lens holder installing device controlled by the later-described computer.

The edging device 40 in FIG. 4 is provided with a grinding wheel 48 coated with a grinding powder, for instance, such as a diamond powder or the like on the perimeter surface, and the grinding wheel 48 connected to the front-end of a spindle 49 rotates together with the spindle 49. The grinding wheel 48 includes a rough machining part 48A and a finish machining part 48B which are arranged in parallel in the axial direction.

After the raw material lens W attached by the lens holder 42 is held by the holder receptor 44 and the lens pusher 43 of the lens holding tool 41, the raw material lens W advances toward the rotating grinding wheel 48 by displacement of the first and the second rotary shafts 45, 46 toward the grinding wheel 48 side conducted by a back-and-forth moving mechanism (not shown) while being rotated by rotation of the first and the second rotary shafts 45, 46. Then, rough edging of the raw material lens W is started by bringing the edge face 4 of the raw material lens W into contact with the rough machining part 48A of the grinding wheel 48. The rough edging is conducted by repeating back-and-forth movement of the first and the second rotary shaft 45, 46 to the grinding wheel 48 by the above-described back-and-forth moving mechanism taking the frame center FC which is the block center of the raw material lens W as a reference position. The raw material lens W is gradually machined into the specified lens shape by repeating back-and-forth movement of the rotating raw material lens W toward the grinding wheel 48 synchronized with the rotation. When the machining amount of the rough edging reaches the specified amount, the edge face 4 of the raw material lens W comes in contact with the finish machining part 48B owing to displacement of the first and the second rotary shafts 45, 46 in the axial direction by an axial direction displacement mechanism (not shown), and the raw material lens W repeats back-and-forth movement taking the frame center FC as a reference position to the finish machining part 48B by back-and-forth movement of the first and the second rotary shafts 45, 46 to the grinding wheel 48.

The rotation of the first and the second rotary shafts 45, 46 as above, and the back-and-forth movement of the first and the second rotary shafts 45, 46, taking the frame center FC (in other words, axis core positions of the first and the second rotary shafts 45, 46) conducted in synchronization with the rotation as a reference position, are conducted according to a computer program to be described later to control the edging device 40, so that a spectacle lens having the specified lens shape shown in FIG. 7 is manufactured from the raw material lens W by this program. The rotation of the first and the second rotary shafts 45, 46 conducted according to the program is started from a rotational initial angular position detected by a rotational initial angular position detector composed of an optical sensor, a rotary disc with a slit, or the like. After one piece of spectacle lens is manufactured from the raw material lens W, the first and the second rotary shafts 46, 46 rotates to the rotational initial angular position detected by the rotational initial angular position detector and stops to prepare for machining the next raw material lens W.

Though the frame center FC of the spectacle lens manufactured by the edging from the raw material lens W in this manner is located at a position shown in FIG. 7, some spectacle lenses manufactured by the edging are finished as if a position FC' deviated from the frame center FC due to machining error or the like were the frame center. In FIG. 7, the deviation between the frame center FC and the position FC' in the horizontal direction is expressed by $\alpha$, and the deviation in the vertical direction is expressed by $\beta$. The broken line in FIG. 7 shows the original spectacle lens 1' which should be manufactured by edging from the raw material lens W when no machining error or the like is produced. The solid line in FIG. 7 shows the spectacle lens 1 which is produced by edging from the raw material lens W when the above-described machining error or the like is produced. It should be noted that the actual amount of the deviation is very small and it is exaggeratingly shown in FIG. 7 for easy understanding.

In the spectacle lens 1 which is manufactured taking the position FC' deviated from the frame center FC as the frame center, the distance between the frame center FC and the actual edge face 4 on which the above-described mounting part 10 is to be machined is not an accurate distance determined from the design based on the original spectacle lens 1', but it includes errors based on the deviations $\alpha$ and $\beta$ from the accurate distance.

Figure 6:
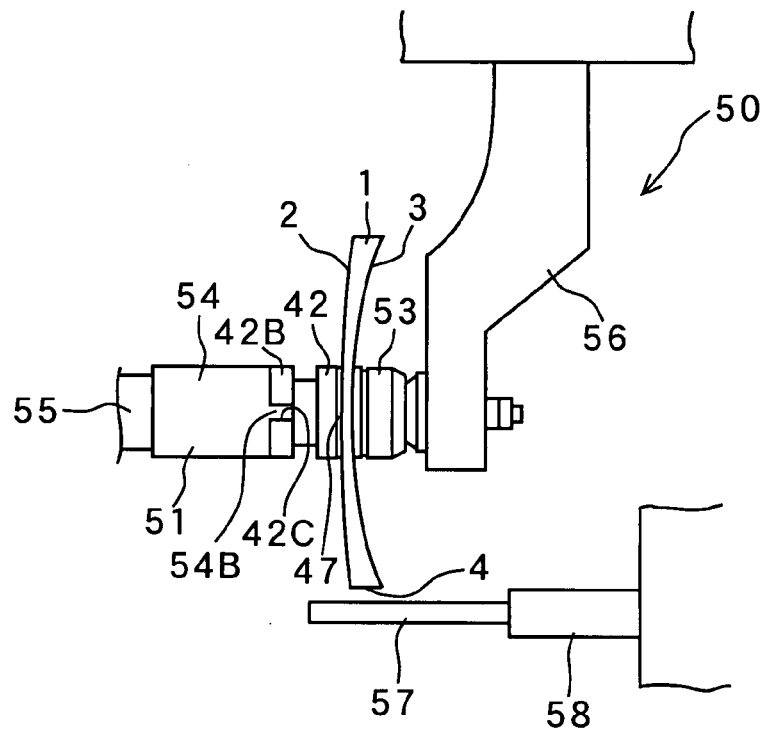
FIG. 6 is a view showing the principal portion of a distance measuring device for measuring a distance produced during edging between a frame center and an edge face of the spectacle lens where the mounting part is to be machined.

FIG. 6 shows a principal portion of a distance measuring device 50 for measuring the distance including these errors. The spectacle lens 1 carried from the edging device 40 in FIG. 4 is held by a lens holding tool 51 also in this distance measuring device 50. The lens holding tool 51 includes the lens holder 42 which has been attached on the convex face 2 side of the spectacle lens 1 since the above-described edging, a lens pusher 53 disposed on the concave face 3 side and a holder receptor 54 in which the lens holder 42 is detachably installed. The holder receptor 54 is connected to the front-end of a rotary shaft 55, and the lens pusher 53 is rotatably installed on an arm 56 which is a member displacing in the axial direction of the rotary shaft 55 by a displacing device not shown.

Since the holder receptor 54 has the same shape and the same structure as the holder receptor 44 in the edging device 40 in FIG. 4, a protrusion 54B is provided in the holder receptor 54 for positioning the lens holder 42 and the spectacle lens 1 in the rotational direction of the rotary shaft 55 with respect to the holder receptor 54 by being inserted into the groove 42C of the lens holder 42. The arm 56 before holding the spectacle lens 1 with the lens holding tool 51 is receded toward the right side in FIG. 6 by the above-described displacing mechanism. After the lens holder 42 is installed in the holder receptor 54 by insertion of the protrusion 54B into the groove 42C, the spectacle lens 1 attached by the lens holder 42 is held by the lens holding tool 51 including the holder receptor 54 and the lens pusher 53 by displacement of the arm 56 toward the lens holder 42 side.

The block center at this time is the frame center FC explained in FIG. 7 because the lens holder 42 used at the time of edging is continuously used without being removed from the spectacle lens 1, and the frame center FC agrees with the position of the axis core of the rotary shaft 55.

The distance measuring device 50 is provided with a stylus 57 to touch on the edge face 4 of the spectacle lens 1. The stylus 57 is supported by a supporting member 58 which can freely move back and forth (displacement in the vertical direction in FIG. 6) by a displacing mechanism (not shown) with respect to the spectacle lens 1, and the displacement amount of the displacing member 58, in other words, the displacement amount of the stylus 57, is determined by a measuring means such as a linear scale or the like.

When the rotary shaft 55 starts to rotate from the rotational initial angular position detected by the rotational initial angular position detector such as an optical sensor, a rotary disc with a slit, or the like, the spectacle lens 1 touched by the stylus 57 on the edge face 4 starts to rotate, and by rotation of the spectacle lens 1 around the rotary shaft 55, in other words, by rotation of the spectacle lens 1 around the frame center FC, the amount of displacement of the stylus 57 in reference to the frame center FC is measured by the above-described measuring means for every angle in the rotational direction of the spectacle lens 1 around the frame center FC, so that the distance between the frame center FC and the edge face 4 of the spectacle lens 1 is measured by the above-described measuring device for every angle in the rotational direction of the spectacle lens 1 around the frame center FC.

Explaining the above description more specifically, in the present embodiment, the spectacle lens 1 is positioned by the groove 42C of the lens holder 42 and the protrusion 54B of the holder receptor 54 in the rotational direction of the rotary shaft 55. The measuring operation is performed based on a computer program to be described later for controlling the distance measuring device 50. Since each rotation angle from the rotational initial angular position of the spectacle lens 1 is recognized in the computer, when the stylus 57 touches on the edge face 4 of the spectacle lens 1, the computer measures the distance between the frame center FC and the edge face 4 using the measuring means. The data regarding the distance is stored in a storage means to be described later.

The distance between the frame center FC and the edge face 4 measured in this way is the distance including the error based on the deviations $\alpha$ and $\beta$ shown in FIG. 7.

The frame center FC' of the spectacle lens 1 actually edged based on the measured results obtained by the distance measuring device 50 is calculated by a calculator of the computer to be described later. A frame center deviation calculator to be described later calculates the deviations $\alpha$ and $\beta$ based on the calculated FC' and the designed frame center FC. The calculated deviations $\alpha$ and $\beta$ are stored in a storage means to be described later.

Note that when the distance measured by the distance measuring device 50 has an error equal to or more than an allowable value compared with a design value, or when the deviation is equal to or more than a specified value, the lens is determined to be a defective and removed without further machining. When the circumference of the spectacle lens 1 is calculated by a calculator in a computer based on the measured results of the distance measuring device 50 and the circumference is found to include an error equal to or more than an allowable value compared with a design value, the spectacle lens is determined to be defective and removed.

Figure 8:
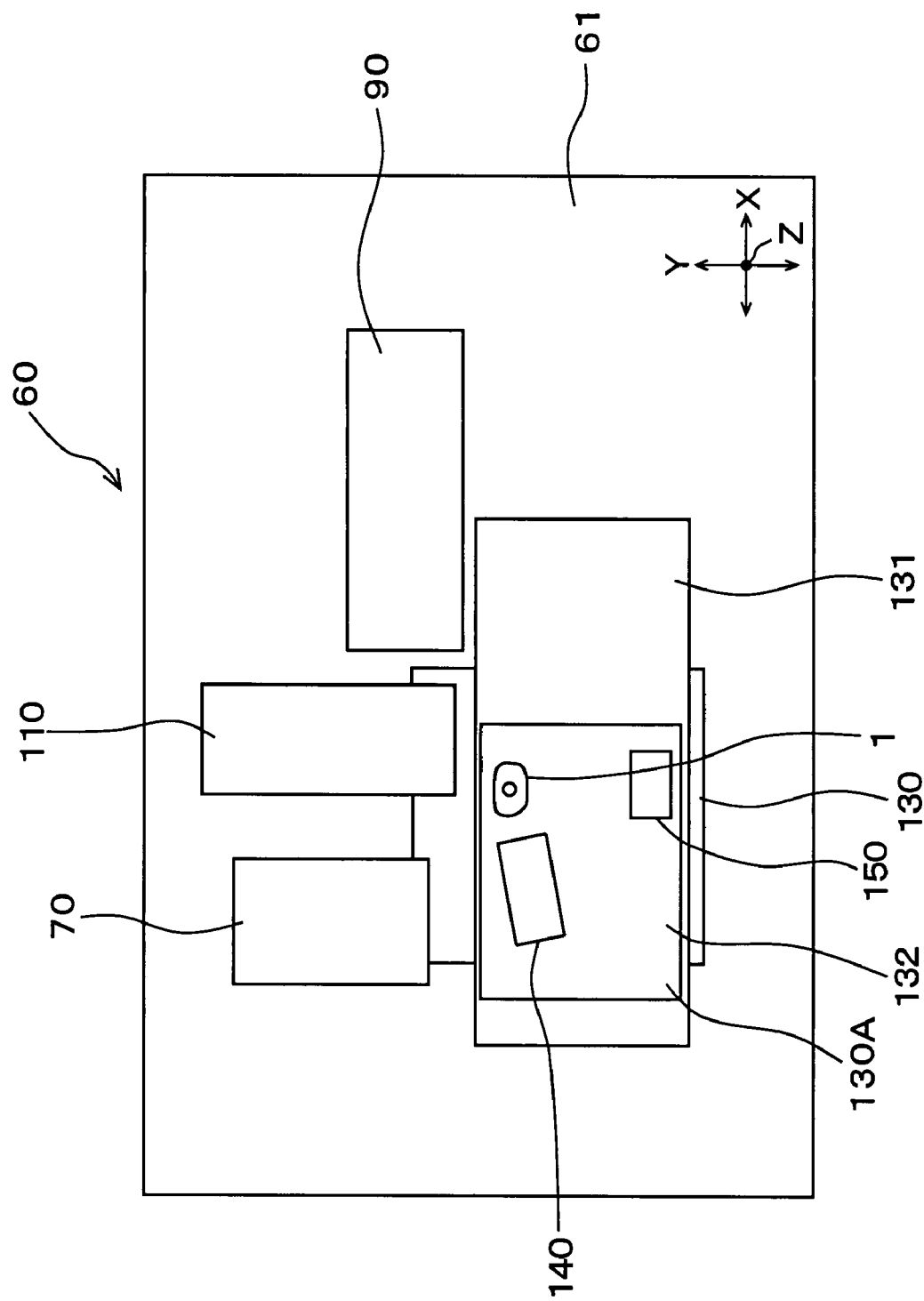
FIG. 8 is a plan view showing the general outlines of a mounting part-machining device for machining a closed-end hole and a notched part serving as the mounting part on the spectacle lens.
Figure 9:
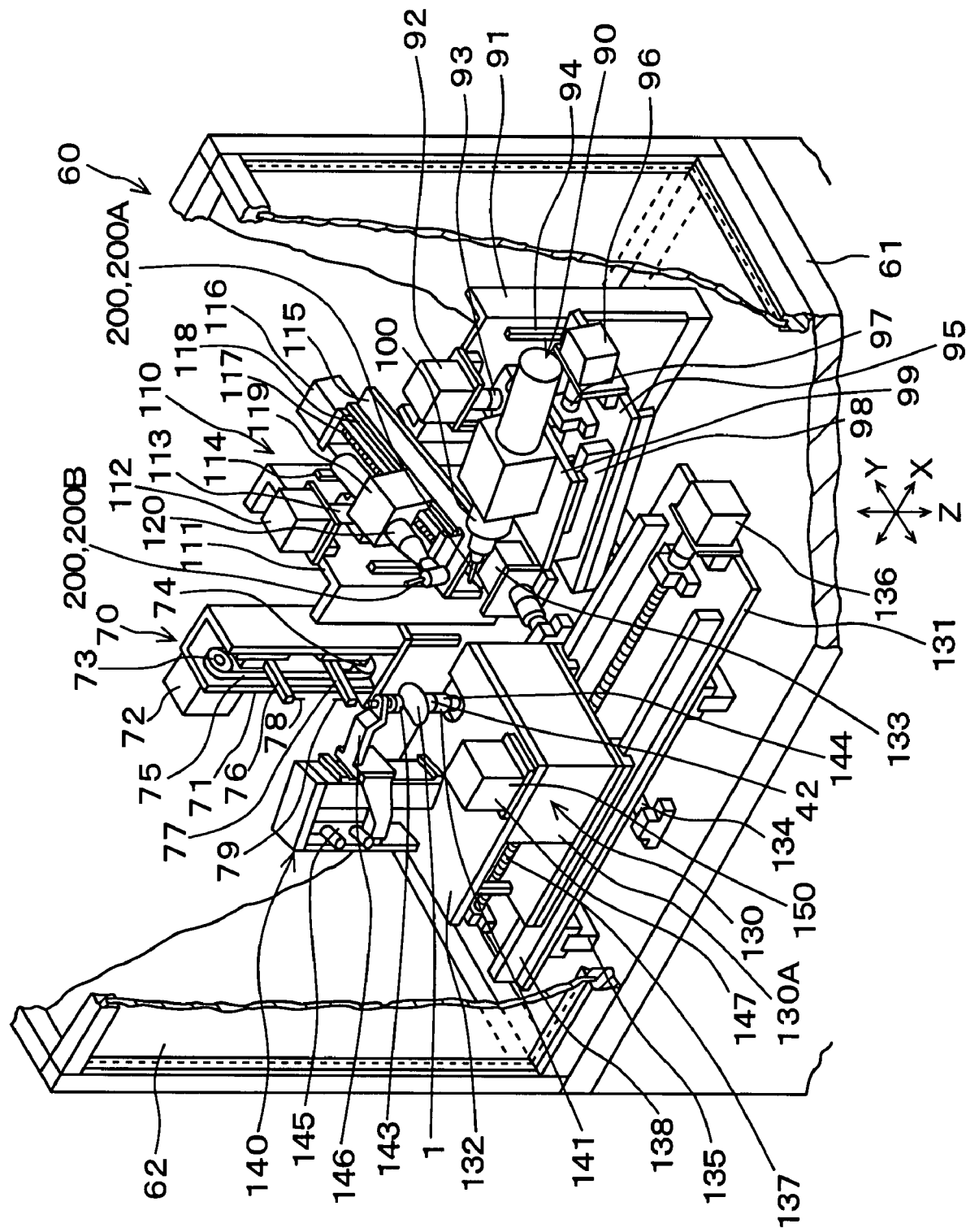
FIG. 9 is a perspective view showing the mounting part-machining device in FIG. 8.

FIGS. 8 and 9 show a mounting part machining device 60, to which the spectacle lens 1 is brought by a worker or a working robot after the distance measuring work is completed by the distance measuring device 50. The mounting part-machining device 60 is used to selectively machine one out of the closed-end hole 10A in FIG. 2 and the notched part 10B in FIG. 3 which are the above-described mounting part 10 of the spectacle lens 1, according to request of a spectacle wearer. FIG. 8 is a plan view showing the general outlines of the mounting part-machining device 60. The whole structure of the mounting part-machining device 60 controlled based on a computer program to be described later will be explained first referring to FIG. 8.

A lens thickness measuring device 70 for measuring the lens thickness at the mounting part-machined portions for the respective mounting parts 10 in the spectacle lens 1, a first machining device 90 for machining the closed-end hole 10A on the spectacle lens 1 with the drill, a second machining device 110 for machining the notched part 10B on the spectacle lens 1 with the cutter, and a lens feeder 130 for displacing the spectacle lens 1 completed the distance measuring work by the distance measuring device 50 in the X direction being the right-and-left direction and in the Y direction being the back-and-forth direction to feed the spectacle lens 1 to the lens thickness measuring device 70, to the first machining device 90, or further to the second machining device 110, are arranged on a horizontal basement 61. The lens feeder 130 includes a Y slide table 131 freely displaceable in the Y direction, and an X slide table 132 arranged on the Y slide table 131 and freely displaceable in the X direction. In the X slide table 132, the spectacle lens 1 is set on the lens feeder 130 while being held in a horizontal attitude and kept at a fixed height by a lens holding device 140 installed on the X slide table 132. At the same time, the spectacle lens 1 is rotatable around a Z axis in the vertical direction by a Z rotation device 150 provided on the X slide table 132.

In other words, the lens feeder 130 includes a horizontal displacement device 130A for displacing the spectacle lens set at a fixed installing height and held in a horizontal attitude in the horizontal directions of X and Y, and a device (Z rotation device 150) for rotating the lens around the vertical axis.

In FIG. 9 showing the detail of the mounting part machining device 60, an upper part space of the basement 61 is covered with a case 62 composed of a transparent plate or the like. Though not shown in the drawings, a blower for blowing cuttings or chippings produced when machining the closed-end hole 10A or the notched part 10B on the spectacle lens 1 by the drill of the first machining device 90 or the cutter of the second machining device 110 from the spectacle lens 1, or a suctioning device for removing the cuttings or chippings by suction, are arranged in the inside of the case 62 provided with an aperture with a door for taking in and out the spectacle lens.

In FIG. 9, the Y slide table 131 being a component member of the lens feeder 130 is guided along a guide rail 135 with a ball screw 134 rotated by a Y motor 133 disposed on the basement 61 to displace in the Y direction. The X slide table 132 is guided along a guide rail 138 with a ball screw 137 rotated by an X motor 136 disposed on the Y slide table 131 to displace in the X direction. The above-described horizontal displacement device 130A for displacing the spectacle lens in the horizontal directions of X and Y is composed of these Y slide table 131, X slide table 132, and so on.

Figure 12:
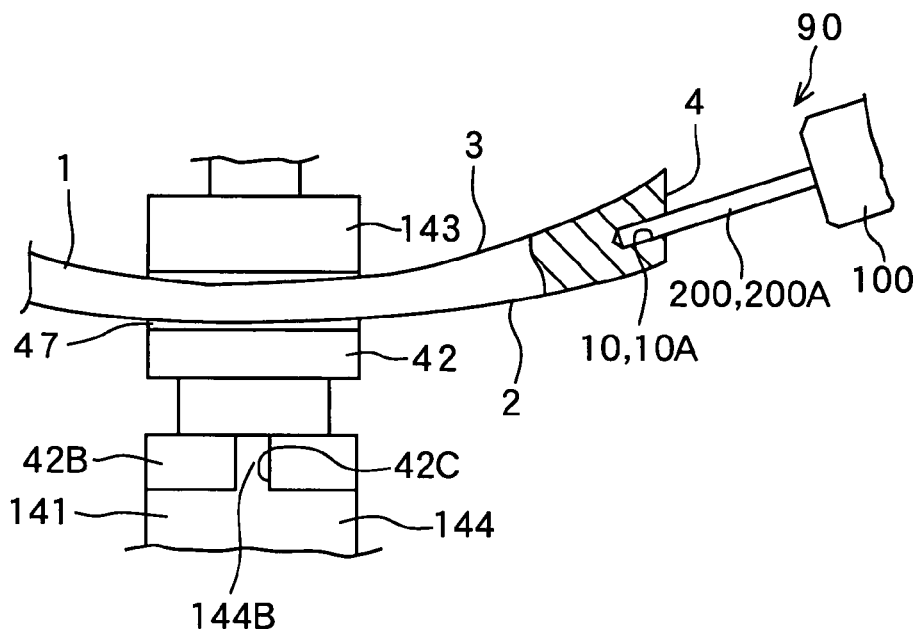
FIG. 12 is a view showing a state at the time when the closed-end hole which is the mounting part is machined on the spectacle lens with a drill which is a machining tool.
Figure 13:
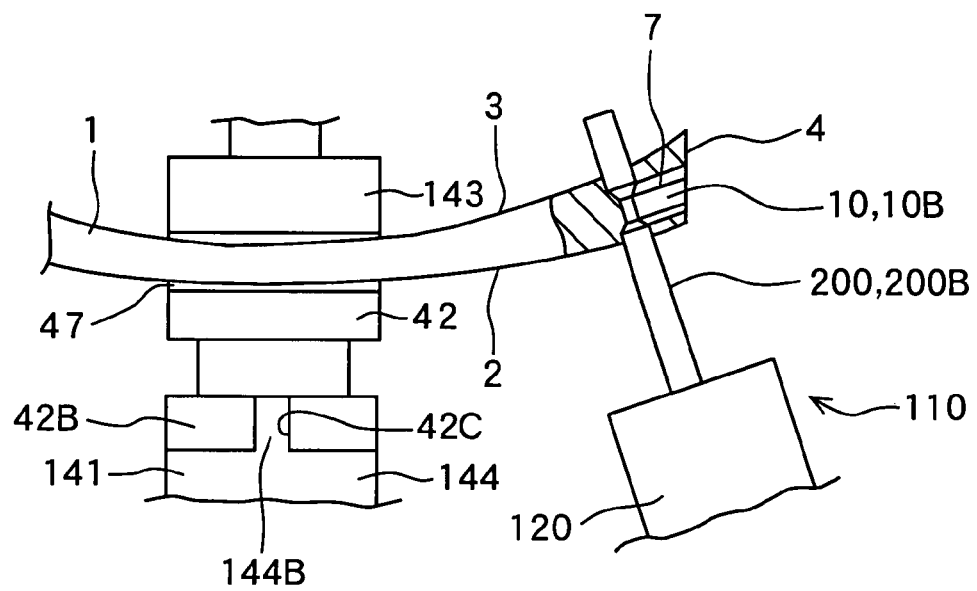
FIG. 13 is a view showing a state at the time when a notched part which is a mounting part is machined on the spectacle lens with a cutter which is a machining device.

In the X slide table 132, a lens holding tool 141 of the lens holding device 140 for holding the spectacle lens 1 at a fixed installation height and in the horizontal attitude as described above is arranged on the convex surface 2 side of the spectacle lens 1 placing the convex surface 2 on the bottom side (refer to FIGS. 12 and 13). The lens holding tool 141 is composed of the lens holder 42 attached on the spectacle lens 1 at the distance measuring work in FIG. 6, a lens pusher 143 disposed on the concave surface 3 side and a holder receptor 144 facing upwards and detachably attached by the lens holder 42. The lens pusher 143 is installed the front-end bottom portion of an arm 146 displacing in the Z direction by the cylinder 145 shown in FIG. 9 so as to be rotatable around the Z axis. The lens holding device 140 is composed of these lens holding tool 141, the cylinder 145 and the arm 146.

When the arm 146 displaces downwards by the cylinder 145, as shown in FIGS. 12 and 13, the lens pusher 143 abuts on the concave face 3 of the spectacle lens 1 attached by the lens holder 42 as described above. Then, the spectacle lens 1 attached by the lens holder 42 is held by the holder receptor 144 and the lens pusher 143 of the lens holding tool 141. The spectacle lens 1 is brought to the mounting part machining device 60 in FIGS. 8 and 9 without the lens holder 42 being removed from the spectacle lens 1 after completion of the distance measuring work explained with FIG. 6, the block center which is a holding center at this time is the frame center FC shown in FIG. 7. Since the lens pusher 143 rises as the arm 146 goes up by the cylinder 145, holding of the spectacle lens 1 attached by the lens holder 42 using the lens holding tool 141 is released.

The holder receptor 144 is connected to a Z motor 147 disposed on the X slide table 132 shown in FIG. 9 via a drive force transmitting mechanism by a gear train or the like incorporated in the bottom space of the X slide table 132, and the holder receptor 144 rotates around the Z axis by a drive force of the Z motor 147. The above-described Z rotation device 150 for rotating the holder receptor 144 and the spectacle lens 1 around the Z axis is composed of these Z motor 147 and drive force transmitting mechanism. The holder receptor 144 has the same shape and structure as the holder receptor 44 in FIGS. 4, 5 and the holder receptor 54 in FIG. 6 as shown in FIGS. 12 and 13. Accordingly, in the holder receptor 144, provided is a protrusion 144B for positioning the lens holder 42 and the spectacle lens 1 in the rotating direction around the Z axis by inserting into the groove 42C of the lens holder 42 with respect to the holder receptor 144.

The position of the holder receptor 144 in the Z axis direction on the X slide table 132 is fixed. Accordingly, the height of the holder receptor 144 from the basement 61 is fixed irrespective of the fed position of the lens feeder 130 in the horizontal directions of X and Y by the horizontal displacement device 130A. Therefore, the vertical position of the holder receptor 144 is a reference position in the Z axis direction in the mounting part-machining device 60.

The above-described Z rotation device 150 is controlled by a computer to be described later for controlling the whole of the mounting part-machining device 60 based on a program. The rotation of the holder receptor 144 and the spectacle lens 1 started from the rotation initial angular position detected by the rotational initial angular position detector composed of an optical sensor, a rotary disc with a slit, or the like are performed to the respective specified angles established in the computer program.

The spectacle lens 1 held by the lens holding device 140 on the X slide table 132 of the lens feeder 130 is fed to respective specified positions in the X and Y directions by the horizontal displacement device 130A of the lens feeder 130 controlled by a computer while it is made in an optional rotation angle by the Z rotation device 150 by the control based on the computer program.

The lens thickness measuring device 70 to which the spectacle lens 1 is fed in this way in FIG. 9 includes a motor 72 installed on a supporting body 71 vertically disposed on the basement 61, a drive timing pulley 73 rotated by the motor 72, a driven timing pulley 74 rotatably installed on the supporting body 71 vertically facing to the pulley 73, and a timing belt 75 looping over these pulleys 73 and 74 arranged vertically. Measurement members 76 and 77 having contactors 78 and 79 vertically facing to each other at the front-end thereof are arranged on the timing belt 75.

Figure 10:
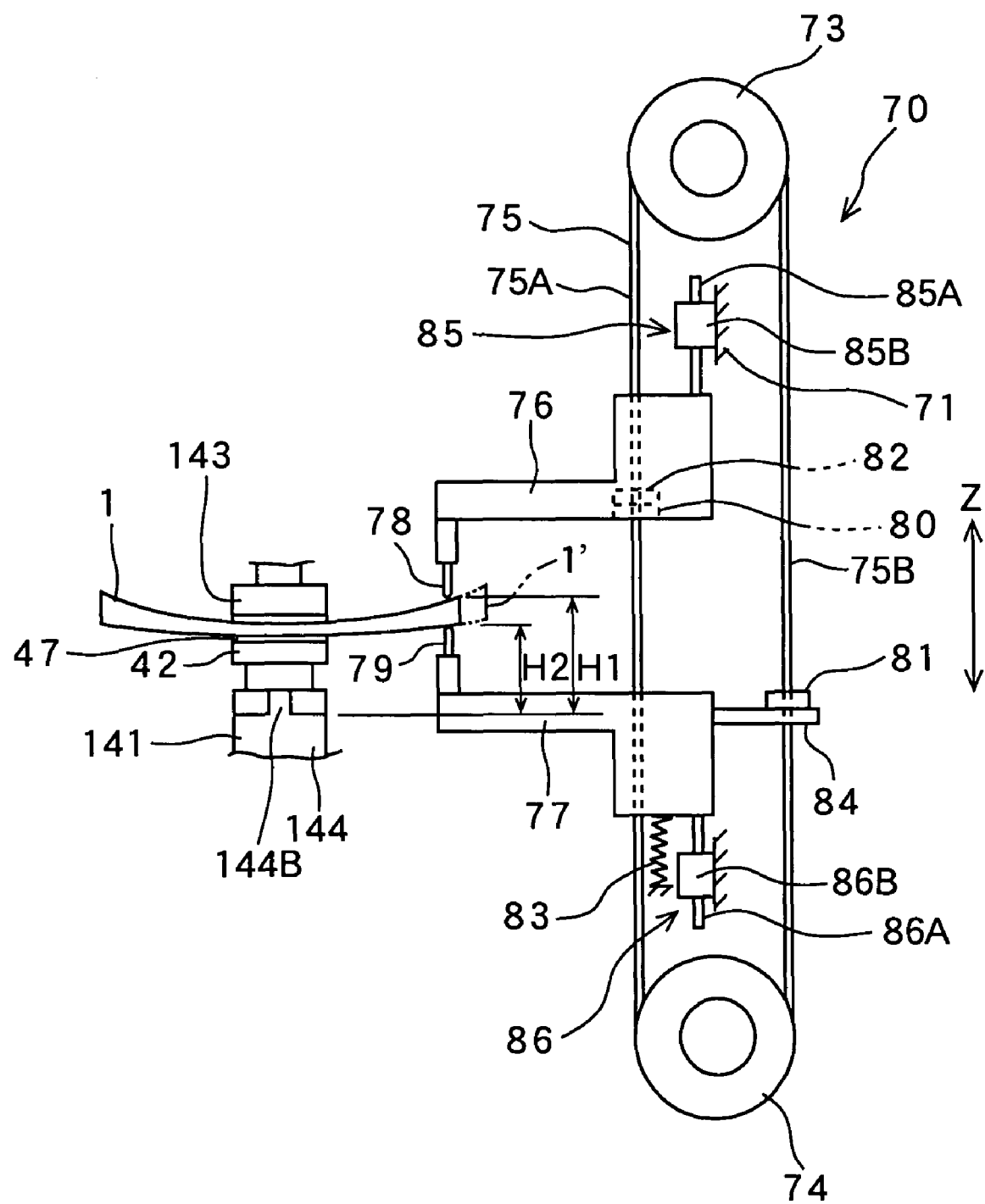
FIG. 10 is a view showing the fundamental structure and the basic principle of a lens thickness measuring device shown in FIG. 9.

FIG. 10 shows the fundamental structure and the basic principle of the lens thickness measuring device 70. A receptor 80 is installed on a front part 75A of the timing belt 75 on the lens feeder 130 side, and a pushing member 81 is installed on a back part 75B. Two pieces of measuring members 76 and 77 are freely movable in the Z direction guided by a guiding member (not shown) provided on the supporting body 71. The upper side measuring member 76 out of two pieces of the measuring members 76, 77 is provided with a rider 82 riding on the receptor 80. The bottom side measuring member 77 is always elastically biased upward by a spring 83, and the measuring member 77 is provided with an abutting member 84 abutting on the pushing member 81 from the bottom with the elastic force of the spring 83.

When two measuring members 76 and 77 are vertically separated from each other at the positions of the datum point or an initial position, the measuring member 76 descends by its own weight according to down movement of the receptor 80 and the measuring member 77 ascends by the elastic force of the spring 83 accompanying an upward movement of the pushing member 81 by left rotation of the drive timing pulley 73 in FIG. 10 by the motor 72 shown in FIG. 9. Displacement of these measuring members 76, 77 are conducted till the front-ends of the contactors 78, 79 come in contact with the spectacle lens 1, and thereafter, the motor 72 stops. The measuring member 76 rises by the upward movement of the receptor 80 abutting on the rider 82 from the bottom on the way and the measuring member 77 descends while compressing the spring 83 with the pushing member 81 which abuts on the abutting member 84 from the above and moves downward by right rotation of the drive timing pulley 73 in FIG. 10 with a reverse drive of the motor 72. Then, these measuring members 76 and 77 stop at the positions of the datum point by suspension of the motor 72.

The lens thickness measuring device 70 is provided with measuring means 85 and 86 for measuring such a displacement amount of the measuring members 76 and 77 in the Z direction. These measuring means 85 and 86 relating to the present embodiment are a linear detection type measuring a displacement amount in a magnetic induction system. By displacing rods 85A and 86A installed on the measuring members 76 and 77 with respect to detectors 85B and 86B installed on the supporting body 71, the distances H1 and H2 from the vertical position of the holder receptor 144 of the lens holding tool 141, which is a reference vertical position specified in advance, to the front-ends of the respective contactors 78 and 79 are measured. At the same time, the thickness at the portions of the spectacle lens 1 coming in contact with the front-ends of the contactors 78 and 79 are designed to be measured based on these distances H1 and H2.

Figure 11:
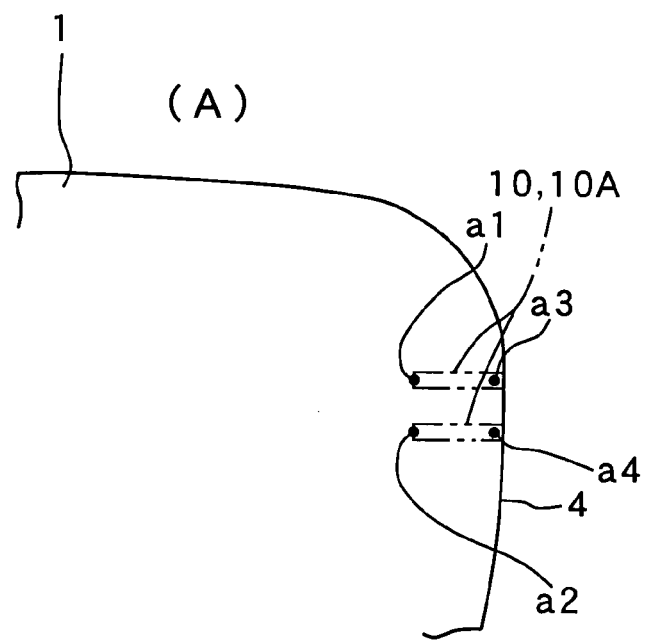
FIGS. 11A and 11B are views showing an example of the portion where the lens thickness is to be measured with the lens thickness measuring device when the mounting part is the closed-end hole (FIG. 11A), and when the mounting part is the notched part (FIG. 11B)
Figure 11:
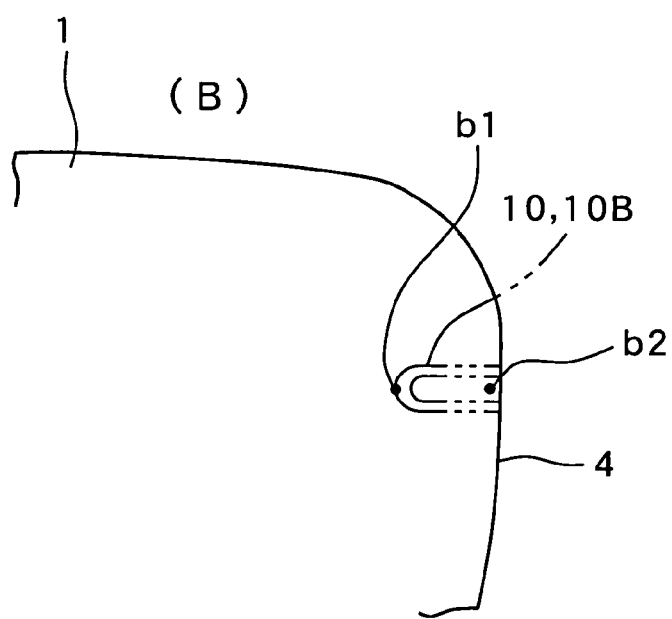

The spectacle lens 1 fed to the lens thickness measuring device 70 by the horizontal displacement device 130A and the Z rotation device 150 of the lens feeder 130 is measured by the lens thickness measuring device 70 for its thickness at the mounting part-machined portion where the respective mounting parts 10 are to be machined. Though the position to be measured can be freely determined, it is more effective to measure two points at the portion most inside of the lens and the portion in the vicinity of the lens edge face 4 in the mounting part-machined portion. FIG. 11 shows the case (A) of the mounting part 10 being the closed-end hole 10A, and the case (B) of the mounting part 10 being the notched part 10B. The two-dot chain line shows the planed shapes of the closed-end hole 10A and the notched part 10B to be machined. In the case of the closed-end hole 10A, its front-end portions a1 and a2, and portions a3 and a4 in the vicinity of the lens edge face 4 are measured, and in the case of the notched part 10B, its front-end portion b1 and the portion b2 in the vicinity of the lens edge face 4 are measured.

Note that the reason why the portions a3, a4 and b1 on the lens edge face 4 side are at the position inside the lens from the lens edge face 4 by the specified amount (for instance, about 1 mm) is to make the front-ends of the contactors 78 and 79 come into contact with the spectacle lens 1 with reliability.

In the present embodiment, in the design to determine the shapes of the lens shape or the mounting part 10 of the spectacle lens 1 to be manufactured, the positions for measuring the spectacle lens thickness to be measured with the lens thickness measuring device 70 are previously determined as described above as an example. In the present embodiment, these designed measurement positions for the frame center FC which will be the block center are corrected with the above-described frame center deviation calculated based on the measured results of the distance measuring device 50 by a later-described computer. The drive amounts of the horizontal displacement device 130A and the rotation device 150 of the lens feeder 130 are corrected by the amount of the frame center deviation by the later-described computer so as to feed the spectacle lens 1 until the new measurement positions required to be measured due to occurrence of the deviation, in other words, the actual measurement positions reaches the positions of the contactors 78 and 79 of the lens thickness measuring device 70. Thereby, the thickness of the spectacle lens 1 is measured by the lens thickness measuring device 70 at the position corrected by the amount of the frame center deviation. As the result of this thickness measurement, the spectacle lens 1 having a portion less than the specified thickness is determined to be defective, and removed without conducting later working process.

It should be noted that the portion where thickness measurement is conducted by the lens thickness measuring device 70 is not limited to the above-described two portions, but it may also be one portion or three portions or more.

The spectacle lens 1, having the lens thickness at the mounting part-machined portion where the mounting part 10 is to be machined measured by the lens thickness measuring device 70 in the manner described above, and having the mounting part 10 to be the closed-end hole 10A, is fed to the first machining device 90 in FIG. 9 by the lens feeder 130. The first machining device 90 includes: a supporting body 91 vertically disposed on the basement 61; a Z slide table 95 displaced in the Z direction while guided through a guide rail 94 by a ball screw 93 rotated by a Z motor 92 arranged on the supporting body 91; a displacing pedestal 99 displaced while guided through a guide rail 98 on the Z slide table 95 by a ball screw 97 rotated by a motor 96 disposed on the Z slide table 95; and a machining tool device 100 arranged on the displacing pedestal 99, having a drill 200A as a machining tool 200 to machine the closed-end hole 10A in the spectacle lens 1, and embedded with a motor to rotate the drill 200A.

The displacing pedestal 99 and the machining tool device 100 displace in the X direction, and the Z slide table 95 slants downward toward the lens thickness measuring device 70 side. Accordingly, the displacing pedestal 99 and the machining tool device 100 displace downward to the lens thickness measuring device 70 side, in other words, the spectacle lens 1 side, as will be understood by later explanation. The height of the drill 200A of the machining tool device 100 is adjusted by displacement of the Z slide table 95 in the Z direction by the Z motor 92.

The second machining device 110 in FIG. 9, to which the spectacle lens 1, having the lens thickness at the mounting part-machined portion where the mounting part 10 is to be machined measured by the lens thickness measuring device 70, and having the mounting part 10 to be the notched part 10A is fed by the lens feeder 130, includes: a supporting body 111 vertically disposed on the basement 61; a Z slide table 115 displaced in the Z direction while guided through a guide rail 114 by a ball screw 113 rotated with a Z motor 112 arranged on the supporting body 111; a displacing member 119 displaced while guided through a guide rail 118 on the Z slide table 115 by a ball screw 117 rotated by a motor 116 disposed on the Z slide table 115; and a machining tool device 120, fixed on the displacing member 119, having a cutter 200B as a machining tool 200 to machine the notched part 10B in the spectacle lens 1, and embedded with a motor to rotate the cutter 200B.

The displacing member 119 and the machining tool device 120 displace in the Y direction, but the Z slide table 115 slants downward toward the lens feeder 130 side. Accordingly, the displacing member 119 and the machining tool device 120 displace downward to the lens feeder 130 side, in other words, the spectacle lens 1 side, as will be understood by later explanation. The height of the cutter 200B of the machining tool device 120 is adjusted by displacement of the Z slide table 115 in the Z direction by the Z motor 112.

In the present embodiment, a horizontal direction fed position and a rotational fed position around the Z axis, of the spectacle lens 1 to the first and the second machining devices 90 and 110 by the horizontal displacement device 130A and the Z rotation device 150 of the lens feeder 130 are corrected based on a frame center deviation calculated from the measured results of the distance measuring device 50. The heights of the drill 200A and the cutter 200B of the machining tool devices 100 and 120 in the first and the second machining devices 90 and 110 are adjusted according to the vertical position at the mounting part-machined portion of the spectacle lens 1 measured by the lens thickness measuring device 70. Correction of the drive amounts of the horizontal displacement device 130A, the Z rotation device 150, and the first and the second machining devices 90 and 120 for performing such correction or adjustment is calculated by a control computer which will be described later.

As shown in FIGS. 12 and 13, the drill 200A of the first machining device 90 and the cutter 200B of the second machining device 110 are set at a certain invariable angle at which the closed-end hole 10A and the notched part 10B can be machined to the spectacle lens 1 while the spectacle lens 1 is kept in a horizontal position. That is, as shown in FIG. 12, the drill 200A is set at an inclination angle slanting downward on the spectacle lens 1 side with respect to the horizontal direction, and as shown in FIG. 13, the cutter 200B is set at an inclination angle slanting to the spectacle lens 1 side from the vertical direction which is the Z direction.

Figure 14:
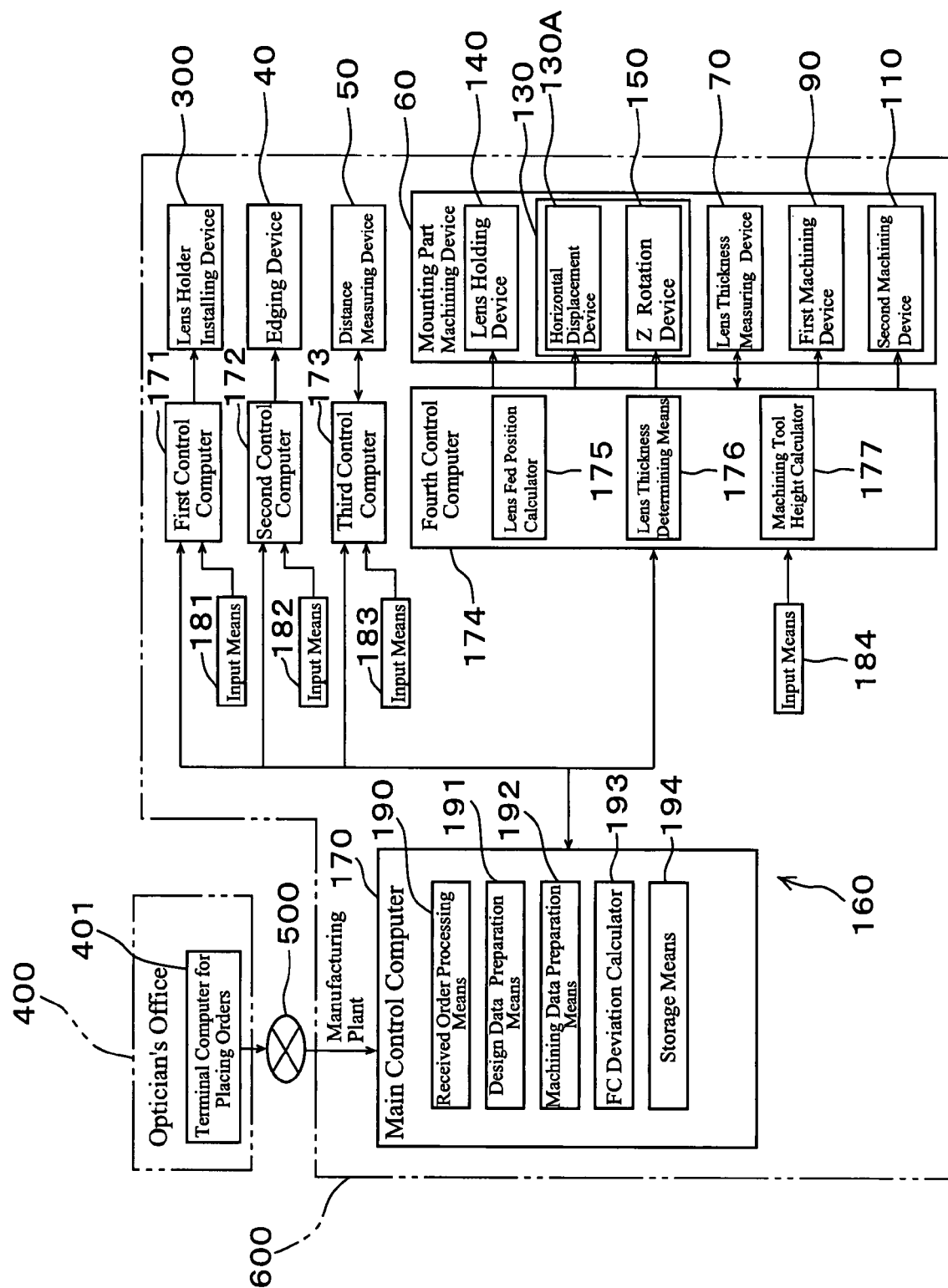
FIG. 14 is a block diagram showing a control system of the whole device.

FIG. 14 shows a control system for controlling the above-described lens holder installing device 300, the edging device 40 in FIG. 4, the distance measuring device 50 in FIG. 6, and the mounting part machining device 60 in FIGS. 8 and 9. In FIG. 14, an optician's office 400 which is the order side, and a lens manufacturing plant 600 which is an lens processing side are also shown, which are connected via a communication media 500. As the communication media 500, for instance, a public communication circuit, a private line, and the internet can be used. A relay station may be provided to the communication media 500 on its way. Note that the following explanation takes into account that the ordering side is an optician's office 400. It is not limited to this, and it may be, for instance, an oculist, an individual, a lens manufacturer's office, or the like. It is also applicable in the case of an order being taken in off-line. In addition, though only one is shown as the ordering side in FIG. 14, many order sides are connected via the communication media 500 actually.

A computer 401 is provided as a computer terminal for online order at the optician's office 400. The terminal computer 401 for placing orders is provided with an input unit, a screen display device, and a communication means as well so as to be connectable to the manufacturing plant 600 side via the communication media 500. The terminal computer 401 for placing orders may be a specifically designed terminal for transmitting and receiving necessary information to order lenses or spectacles, or may be a general use personal computer having a software for placing orders installed. In addition, a WWW server is provided in a network or a relay station on the manufacturing plant 600 side, and a document or a program for placing orders is registered thereon so that an order screen may be displayed by a WWW browser of the terminal computer for placing orders.

The lens holder installing device 300 for attaching the lens holder 42 on the raw material lens W shown in FIG. 4, a first control computer 171 for controlling the lens holder installing device 300, the edging device 40, a second control computer 172 for controlling the edging device 40, the distance measuring device 50 shown in FIG. 6, a third control computer 173 for controlling the distance measuring device, the mounting part machining device 60 shown in FIGS. 8 and 9, a fourth control computer 174 for controlling the mounting part machining device 60, a main control computer 170 connected to these first to fourth control computers 171 to 174 via a network, and input means 181 to 184 provided in the first to the fourth control computers 171 to 174 are arranged in the manufacturing plant 600. A general controller 160 of the present embodiment in the manufacturing plant 600 is structured with these computers 170 to 174 and input means 181 to 184.

The input means 181 to 184 are, an operating means such as, for instance, a key board, a mouse, or the like, or a reader which can read information (bar code, other two-dimensional codes, IC memory, or the like) capable of identifying an ordered lens.

The fourth control computer 174 controls the lens holding device 140, the horizontal displacement device 130A and the Z rotation device 150 of the lens feeder 130, the lens thickness measuring device 70, the first machining device 90, and the second machining device 110 which are the devices provided in the mounting part machining device 60.

The main control computer 170 is provided with a connecting means (not shown) performing connection with the above-described terminal computer 401 for placing orders, a received order processing means 190 for receiving and processing orders for spectacles or spectacle lenses from the terminal computer 401 for placing orders, a design data preparation means 191 for preparing design data for spectacle lens to be manufactured based on the content of the order received, a machining data preparation means 192 for preparing machining data necessary to control various manufacturing devices based on the design data, a frame center deviation calculator (referred to as a FC deviation calculator, hereinafter) 193 for calculating based on the measured results of the distance measuring device 50, the actual frame center deviation from the design valued frame center, a storage means 194 for storing various data necessary for spectacles manufacturing, and a means (not shown) for conducting control and management of the first to the fourth control computers 171 to 174.

It should be noted that description of other structures necessary for manufacturing spectacles not directly related to the present embodiment is omitted. Furthermore, functions possessed by the above-described various computers or networking equipments can be unified or dispersed as necessary.

When the information about spectacles which is ordered from the terminal computer 401 for placing orders is inputted to the main control computer 170, this information is stored in the storage means 194 as data on a received order. Information of spectacle lens, information of spectacle frame, prescription values, information of layout, and so on are data on a received order. Information about lens type (lens material, refractive index, optical design for the front and back surfaces of a lens, lens outside diameter, lens colors, coatings, product identification code enabling the above, and so on), or information about instruction for machining of lens (lens thickness, edge thickness, decentering, method of finishing edge face, type of mounting part, and so on) are information about spectacle lenses. Frame size, frame material, color, shape, lens shape type, product identification code capable of identifying these items, and so on are information about spectacle frames. There are S dioptric power, C dioptric power, prism, addition power, and so on are prescription values. Interpupillary distance, near vision interpupillary distance, SEGMENT small lens position, eye point position and so on, are layout information.

The main control computer 170 is provided with a spectacle lens machining design program as the design data preparation means 191. A required shape of the lens is calculated by this program based on the above-described data on a received order, which are information about orders, and data necessary for the design (information about optical face shape, lens shape, and so on), which are stored in the storage means 194 in advance. The position of the frame center FC is also calculated here. The calculated information about a shape of the lens is stored in the storage means 194 as the design data. Furthermore, this program calculates design values for lens machining in each manufacturing process and determines the machining conditions based on the machining design values (design values and usable tools for various machining devices). These pieces information about lens machining are stored in the storage means 194 as machining data. A manufacturing specification for each lens is specified based on these data on received orders, design data, and machining data, and manufacturing and machining of lens, manufacturing and assembling of spectacles are performed based on the above.

In order to manufacture an order-received spectacle lens, a raw material lens W from which the lens is made is determined based on the data on the order received, the design data, and the like. In the case of a lens formed in a thickness thicker by the amount of margins for cutting or grinding without having optically finished one or both optical faces of the raw material lens to be used, the optical faces are finished by cutting the raw material lens into optical face having the specified shape with a cutting device (for instance, a three-dimensional numerical control curve generator) leaving the margin for grinding and by grinding with a grinder. Thereafter, dying and surface treating are conducted according to the content of order received. As for the surface treatment, hard coating, antireflective coating, antiwaterburn coating, water repellent coating, stain-proof coating, and the like can be cited. Then, inspection of outside appearance, optical characteristics and lens thickness is conducted in an inspection process. The lens which passed the inspection is shifted to the next process. Since the work so far is conducted using a conventional technology, detailed explanation will be omitted.

The lens holder 42 is attached on the raw material lens W thus prepared by the lens holder installing device 300. For this purpose, identification information about the spectacle lens 1 is inputted in the first control computer 171 by the input means 181. By this step, information necessary for the identified spectacle lens is taken out from the storage means 194 of the main control computer 170. Information about the position of the frame center is included in the information taken out from the storage means. The lens holder 42 is attached on this frame center position by the lens holder installing device 300, and the raw material lens W thus attached by the lens holder 42 is fed to the edging device 40.

When edging of the raw material lens W is started with the edging device 40, the identification information on the spectacle lens 1 is inputted into the second control computer 172 with the input means 182. Thereby, the second control computer 172 takes out the information necessary for edging from the storage means 194 of the main control computer 170. The edging device 40 is drive-controlled based on the information so that the spectacle lens 1 having the specified lens shape is manufactured from the raw material lens W.

The spectacle lens 1 is fed to the distance measuring device 50. When the distances between the frame center FC of the spectacle lens 1 and the edge face 4 of the spectacle lens 1 where respective mounting parts 10 are to be machined are measured, the identification information on the spectacle lens 1 is inputted into the third control computer 173 with the input means 183. Then, the third control computer 173 takes out the information necessary for distance measurement from the storage means 194 of the main control computer 170 similarly to the case of the above-described edging. The distance measuring device 50 is driven-controlled based on this information and measures the distances between the frame center FC of the spectacle lens 1 and the edge face 4 of the spectacle lens 1 where respective mounting parts 10 are to be machined. The measurement data are sent to the main control computer 170 from the third control computer 173 and stored in the storage means 194 with the identification information.

When a machining error is produced at the time of edging by the above-described edging device 40, the distance measured by the distance measuring device 50 in this manner includes errors based on the deviations $\alpha$ and $\beta$ explained referring to FIG. 7. This distance differs from the accurate design distance.

The main control computer 170 calculates the frame center deviation using the FC deviation calculator 193 based on the measuring data on this distance and stores the deviation in the storage means 194 together with the identification information.

When the mounting part 10 is machined to the spectacle lens 1 with the mounting part machining device 60, the identification information about the spectacle lens 1 is inputted into the fourth control computer 174 with the input means 184. Then, the fourth control computer 174 takes out information necessary to machine the mounting part 10 of the spectacle lens 1 from the storage means 194 of the main control computer 170, and the mounting part 10 of the spectacle lens 1 is machined based on the information by drive-controlling the lens holding device 140, the horizontal displacement device 130A and the Z rotation device 150 of the lens feeder 130, the lens thickness measuring device 70, the first machining device 90 and the second machining device 110 which are provided in the mounting part machining device 60 in the specified turn.

When the fourth control computer 174 drive-controls the horizontal displacement device 130A and the Z rotation device 150 of the lens feeder 130 for the purpose of feeding the spectacle lens 1 to the lens thickness measuring device 70, the first machining device 90 and the second machining device 110, it is performed based on the data of the distance measured by the distance measuring device 50 including the above-described error. Consequently, the spectacle lens 1 is fed in the horizontal direction of X and Y, and in the rotational direction around the Z axis by the fed amount taking the above-described error into consideration.

When such determination of the fed amount of the spectacle lens 1 by the horizontal displacement device 130A and the Z rotation device 150 of the lens feeder 130 is performed by using the deviation calculated with the FC deviation calculator 193, it simplifies the calculation. Therefore, it is preferable to do as follows. That is, it is possible to easily calculate the fed amount taking the above-described error in consideration by storing the designed lens thickness measuring point and the position of the mounting part-machined portion in the storage means 194 in reference to the designed frame center FC beforehand, and correcting the lens thickness measuring point and the position of the mounting part-machined portion with the above-described deviation.

Further explanation about feeding of the spectacle lens 1 by the fed amount taking the above-described error in consideration as above will be made. The fed amount of the spectacle lens 1 by the horizontal displacement device 130A and the Z rotation device 150 of the lens feeder 130 to make the designed thickness measuring point agree with the measuring point by the lens thickness measuring device 70 in the spectacle lens is corrected by the deviations $\alpha$ and $\beta$. Therefore, when the spectacle lens 1 held by the lens holding device 140 is fed to the lens thickness measuring device 70 by the horizontal displacement device 130A and the Z rotation device 150 of the lens feeder 130, the accurate lens thickness measuring point in the actual spectacle lens 1 agrees with the measuring point by the lens thickness measuring device 70, as shown in FIG. 10 (the two-dot chain line 1' in FIG. 10 shows an original spectacle lens manufactured without machining errors similarly to the case of the spectacle lens shown by the broken line in FIG. 7).

When explaining it more specifically, a designed thickness measuring point is determined in advance in reference with the designed frame center, and is stored in the storage means 194 of the main control computer 170. Then, information on the position of the designed thickness measuring point and information on the deviations $\alpha$ and $\beta$ are sent to the fourth control computer 174. The fed amount of the horizontal displacement device 130A and the Z rotation device 150 of the lens feeder 130, in other words, the fed position in the horizontal direction and the fed height in the rotational direction around the Z axis by these devices 130A and 150 is and are calculated so that the thickness measuring point taking the deviations $\alpha$ and $\beta$ into consideration agrees with the position of the measuring point by the lens thickness measuring device 70, using the lens fed position calculator 175 which is a program registered in the fourth control computer 174 based on these information. The fourth control computer 174 drive-controls the horizontal displacement device 130A and the Z rotation device 150 of the lens feeder 130 so that the calculated fed position agrees with the thickness measuring point of the spectacle lens 1. The lens thickness measuring device 70 measures the thickness of the spectacle lens 1 at its thickness measuring point.

It should be noted that the rotational feeding position by the Z rotation device 150 may be of specified values for right and left (bridge side and lug side) respectively, and only the fed position by the horizontal displacement device 130A may be calculated. Furthermore, the fed positions by the horizontal displacement device 130A and the Z rotation device 150 to measure the lens thickness at the original respective thickness measuring points are calculated by the main control computer 170 based on the designed value in advance and store the results in the storage means 194. Then, the designed fed positions and the deviations α and β are sent to the fourth control computer 174, and the fed amounts by the horizontal displacement device 130A and the Z rotational device 150 may be corrected by the fourth control computer 174 based on the deviations α and β. The role sharing of the main control computer 170 and the fourth control computer 174 for determining such a fed position may be changed within the range of no hitch without limiting to the above-described example.

By taking the above-described process, the lens thickness at a mounting part machined portion where the mounting part is actually machined in the spectacle lens 1 is measured by the lens thickness measuring device 70. The measured data are sent to the fourth control computer and the main control computer 170 and stored in the storage means 194.

It should be noted that information on the height of the optical face of the spectacle lens 1, which is applied at the time of determining the height of the drill 200A and the cutter 200B being machining tools 200 of the first and the second machining device 90 and 110 is included in the data on the lens thickness measured in this way.

In the present embodiment, the closed-end hole 10A and the notched part 10B being the mounting part 10 have a length extending from the edge face 4 towards the inside of the lens of the spectacle lens 1. Accordingly, measurement of the lens thickness by the lens thickness measuring device 70 is performed at two portions: slightly deviated portion from the edge face 4 towards the inside of the lens of the spectacle lens 1, and far separated portion from the above portion further toward the inside of the lens as explained referring to FIG. 11. The measurement work for such two portions is performed as described above by driving the horizontal displacement device 130A and the Z rotation device 150 of the lens feeder 130 for each of several pieces of machined portions 10 for every one piece of the spectacle lens 1.

When the thickness of the mounting part machined portion measured by the lens thickness measuring device 70 is sent to the fourth control computer 174, whether or not the mounting part machined portion has a suitable thickness is determined by a lens thickness determining means 176 being a program registered in the fourth control computer 174. More specifically, the lower limit value of a lens thickness capable of keeping a sufficient strength is stored in a storage unit of the fourth control computer 174 in advance, and whether or not the measured lens thickness is equal to or thicker than the lower limit value is determined by the lens thickness determining means 176. When the lens thickness is equal to or thicker than the lower limit value, the spectacle lens 1 is fed to the first machining device 90 or the second machining device 110 depending on whether the mounting part 10 is the closed-end hole 10A or the notched part 10B, by drive-control of the horizontal displacement device 130A and the Z rotation device 150 of the lens feeder 130 by the fourth control computer 174.

Note that the lower limit value of the lens thickness can be determined according to the type of the mounting part 10, or the type of the lens material respectively.

As for the spectacle lens 1 having the closed-end hole 10A as the mounting part 10, the spectacle lens 1 is thereafter arranged at an adequate position on the X-Y plane relative to the first machining device 90 by the horizontal displacement device 130A and the Z rotation device 150 of the lens feeder 130. At the same time, the Z slide table 95 is displaced in the vertical direction by driving the Z motor 92 of the first machining device 90, and the drill 200A being the machining tool 200 of the machining tool device 100 is disposed at an adequate height relative to the spectacle lens 1. The machining tool device 100 on the displacing pedestal 99, which is arranged at an adequate height relative to the spectacle lens 1, downwardly advances from the retreated position or the position of the datum point toward the spectacle lens 1 side by driving of the motor 96. By this movement, as shown in FIG. 12, the closed-end hole 10A is machined in the spectacle lens 1 by the drill 200A advancing toward the inside of the lens from the edge face 4 of the spectacle lens 1 within the thickness range of the spectacle lens 1. When the machining tool device 100 advances by the specified distance from the position of the datum point, the machining tool device 100 retreats to the datum point by reverse driving of the motor 96.

Machining of the closed-end hole 10A by the back-and-forth movement of such a machining tool device 100 is conducted by driving the horizontal displacement device 130A and the Z rotation device 150 of the lens feeder 130 for each closed-end hole 10A of the total 4 holes for each piece of the spectacle lens 1.

As for the spectacle lens 1 having the notched part 10B as the mounting part 10, it is disposed at an adequate position on the X-Y plane relative to the second machining device 110 by the horizontal displacement device 130A and the Z rotation device 150 of the lens feeder 130. At the same time, the Z slide table 115 is displaced in the vertical direction by driving the Z motor 112 of the second machining device 110, and the cutter 200B being the machining tool 200 of the machining tool device 120 is disposed at an adequate position relative to the spectacle lens 1. The machining tool device 120 installed on the displacing member 119, which is arranged at an adequate height relative to the spectacle lens 1, downwardly advances from the retreated position or the position of the datum point toward the spectacle lens 1 side by driving of the motor 116. By this movement, as shown in FIG. 13, the notched part 10B is machined in the spectacle lens 1 by the cutter 200B advancing toward the inside of the lens from the edge face 4 of the spectacle lens 1. When the machining tool device 120 advances by the specified distance from the position of the datum point, the machining tool device 120 retreats to the datum point by reverse driving of the motor 116.

Then, machining of the notched part 10B by the back-and-forth movement of such a machining tool device 120 is performed by driving the horizontal displacement device 130A and the Z rotation device 150 of the lens feeder 130 for each notched part 10B of the total 2 notched parts for each piece of the spectacle lens 1.

Feeding of the spectacle lens 1 to the first machining device 90 and the second machining device 110 by the horizontal displacement device 130A and the Z rotation device 150 of the lens feeder 130 is conducted based on the data on the distance including the errors measured by the distance measuring device 50 similarly to the case of feeding to the lens thickness measuring device 70. Since the determination of the fed position by the horizontal displacement device 130A and the Z rotation device 150 of the lens feeder 130 by using the deviation calculated with the FC deviation calculator 193 simplifies the calculation in this case also. Therefore, it is preferable to do so. Specifically, the information about the position of the edge face portion of designed mounting part-machined portion (referred to as a mounting part machining start position, hereinafter) taking the designed frame center FC as a reference, and a rotation angle around the Z axis determining the machining direction of the mounting part machining part are taken out from the storage means 194 of the main control computer 170. Then, the actual mounting part machining start position based on the actual frame center FC' as the reference is calculated by the lens fed position calculator 175 taking the above-described deviation into consideration. Thereafter, based on the calculated position information, the fed position of the spectacle lens 1 and the rotation angle around the Z axis of the spectacle lens 1 relative to the first machining device 90 and the second machining device 110 by the horizontal displacement device 130A and the Z rotation device 150 of the lens feeder 130 are calculated. Finally, the horizontal displacement device 130A and the Z rotation device 150 of the lens feeder 130 are drive-controlled by the fourth control computer 174 so that the spectacle lens 1 takes the calculated rotation angle around the Z axis at the calculated fed position.

The height in the vertical direction of the drill 200A of the first machining device 90 and the cutter 200B of the second machining device 110 is set at an adequate height based on the height of the lens optical face at the portion near the lens edge face of the mounting part machined portion measured by the lens thickness measuring device 70. As for a manner to determine the height, the height of the convex face side optical face (height of the lower side optical face in the case of the present embodiment) is taken as a datum, the height is determined so that the drill 200A and the cutter 200B face to the position corresponding to the specified height. To be more specific, the height of the drill 200A or the cutter 200B is calculated by a machining tool height calculator 177 based on the height information of the lower side optical face near the edge face of the mounting part machined portion obtained by measurement with the lens thickness measuring device 70 and stored in the storage unit of the fourth control computer 174. Then, the Z motors 92 and 112 of the first and second machining devices 90 and 110 are control driven so that the drill 200A and the cutter 200B can be at the calculated height.

It should be noted that when the height at the lower side optical face near the edge face of the mounting part machined portion has an error exceeding the specified value relative to the design value, the machining of the mounting part is not conducted, and the spectacle lens may be disposed of as a defective.

When the depth of the closed-end hole 10A or the notched part 10B to be machined has to be changed, the advance amount of the drill 200A and the cutter 200B relative to the spectacle lens may be modified by changing the drive amount of the motors 96 and 116 so as to have a depth corresponding to the design value, or the fed amount of the horizontal displacement device 130A of the lens feeder 130 may be changed while keeping the advance amount fixed.

The spectacle lens 1 having completed the machining of the closed-end hole 10A and the notched part 10B as above is sent to the original position by return of the horizontal displacement device 130 and the Z rotation device 150 of the lens feeder 130 to the positions of the datum points, and holding of the spectacle lens 1 by the lens holding device 140 is released at this position. Then, the spectacle lens 1 is unfastened from the lens holder 42 including the holder receptor 144 by a worker or a working robot, and the spectacle lens 1 from which the lens holder 42 is removed is fed to the next processing step.

By the above-procedures, the lugs 21, 31 and the bridge 22 as the spectacle frame components shown in FIG. 1 through FIG. 3, are attached on the closed-end hole 10A and the notched part 10B which are the mounting part 10 of the spectacle lens 1 according to the type of the spectacle lens 1 to complete the spectacles.

When the determination by the lens thickness determining means 176 shows the thickness of the mounting part machined portion measured by the lens thickness measuring device 70 as described above to be shorter than the lower limit value of the allowable values, the spectacle lens 1 is fed to the original position by returning to the position of the datum point of the horizontal displacement device 130A and the Z rotation device 150 of the lens feeder 130 drive-controlled by a fourth control computer 174. That is, in this case, the first machining device 90 and the second machining device 110 are not driven, and machining of the mounting part 10 by these machining devices 90 and 110 are suspended. The holding of the spectacle lens 1 by the lens holding device 140 is released at the original position. Then, the spectacle lens 1 is unfastened from the lens holder 42 including the holder receptor 144 by a worker or a working robot, and the spectacle lens 1 from which the lens holder 42 is removed is disposed of as a defective.

Figure 15:
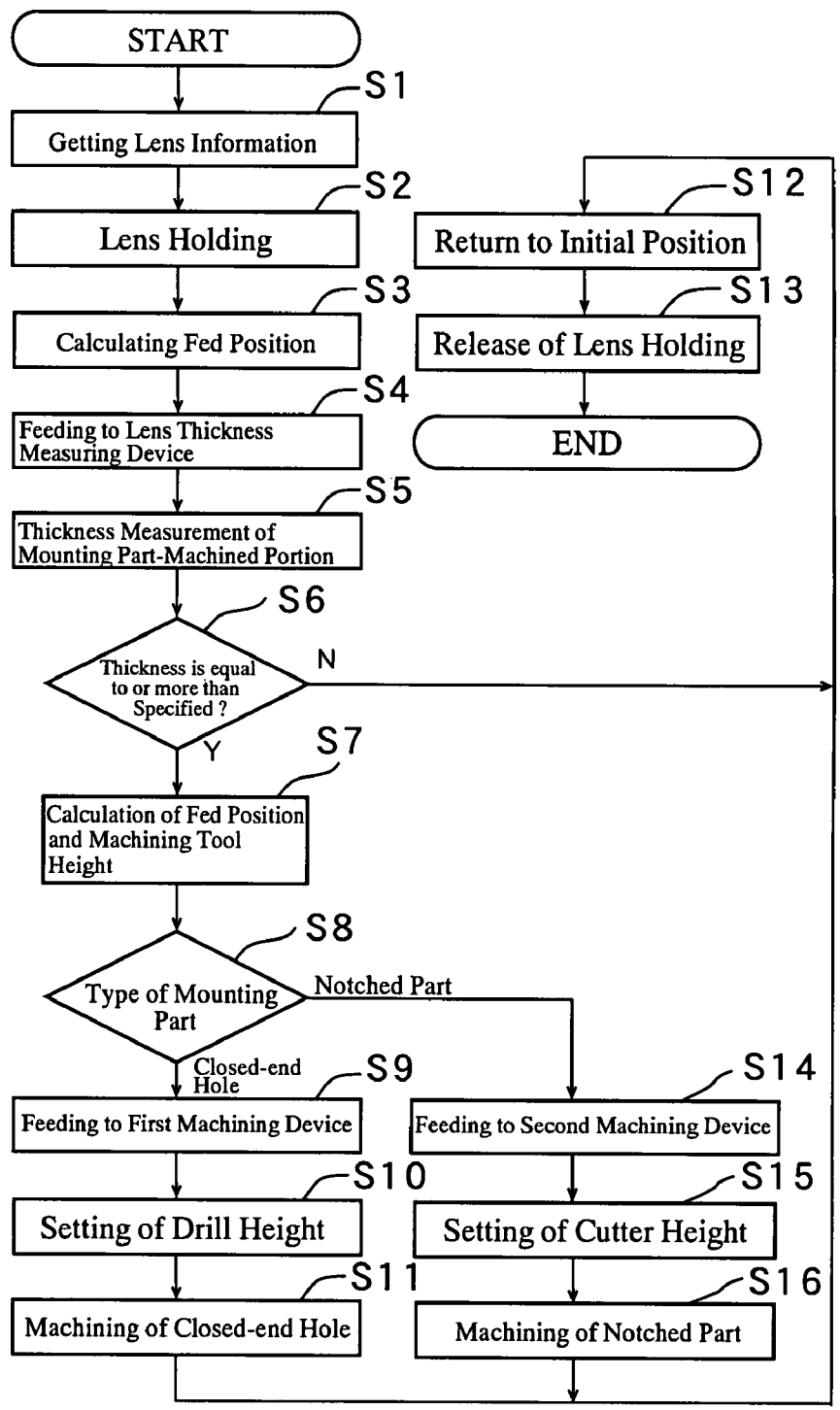
FIG. 15 is a flow chart showing a spectacle lens processing work by the mounting part-machining device in FIGS. 8 and 9 conducted by control of a fourth control computer in FIG. 14.

FIG. 15 is a flow chart showing processing works of the spectacle lens 1 at the mounting part machining device 60 conducted by control of the fourth control computer 174 explained as above.

First, in Step S1, identification information on the spectacle lens 1 in which the mounting part 10 is to be machined is inputted into the fourth control computer 174 by the input means 184, and the inputted identification information is sent to the main control computer 170, so that information necessary for machining the mounting part 10 previously stored in the storage means 194 is taken out. In Step S2, the spectacle lens 1 attached by the lens holder 42 is held by the lens holding device 140. In Step S3, the fed position by the horizontal displacement device 130A and the Z rotation device 150 of the lens feeder 130 for measuring the lens thickness by the lens thickness measuring device 70 at each thickness measuring point is calculated by the lens fed position calculator 175 based on the information taken out from the storage means 194. In Step S4, the spectacle lens 1 is fed to the lens thickness measuring device 70 for measuring the lens thickness at the calculated position, and in Step S5, the lens thickness is measured at a measuring point of the mounting part machined portion where the mounting part 10 of the spectacle lens 1 to be machined. Then, the horizontal displacement device 130A and the Z rotation device 150 of the lens feeder 130 is driven to conduct measurement of the lens thickness at the next measuring point, and the measurement of the lens thickness at this measuring point is performed. This process is repeated until measurement of all measuring points are completed. In other words, Step S4 and Step S5 are performed for each measuring point.

The above-described thickness measurement results are sent to the storage unit of the fourth control computer 174, and at the same time, sent to the storage means 194 of the main control computer 170 from the fourth control computer 174.

In Step S6, the lens thickness determining means 176 of the fourth control computer 174 determines whether or not the measured lens thickness is equal to or larger than the specified value. In Step S7, when the lens thickness at all measuring points is equal to or larger than the specified value, the fed position by the horizontal displacement device 130A and the Z rotation device 150 of the lens feeder 130 is calculated by the lens fed position calculator 175 based on the information obtained in Step S1, and at the same time, the height of the machining toot 200 is calculated by a machining tool height calculator 177. When the type of the mounting part 10 is the closed-end hole 10A (corresponding to the case of machining using the first machining device 90) in Step S8, the horizontal displacement device 130A and the Z rotation device 150 of the lens feeder 130 in Step S9 feeds the spectacle lens 1 to the fed position of the first machining device 90 calculated in Step S7, and at the same time, in Step S10, the height of the drill 200A of the first machining device 90 is set at the height of the machining tool calculated in Step S7. Thus, the spectacle lens 1 is sent to the first machining device 90 of which machining tool 200 is the drill 200A, and the closed-end hole 10A is machined to the spectacle lens 1 with the drill 200A in Step S11.

Thereafter, the spectacle lens 1 is returned to the original position by driving the horizontal displacement device 130A and the Z rotation device 150 of the lens feeder 130 in Step S12, and holding of the spectacle lens 1 by the lens holding device 140 is released in Step S13.

Meanwhile, when the type of the mounting part 10 is the notched part 10B (corresponding to the case of machining using the second machining device 110) in Step S8, the horizontal displacement device 130A and the Z rotation device 150 of the lens feeder 130 in Step S14 feeds the spectacle lens 1 to the fed position of the second machining device 110 calculated in Step S7, and at the same time, in Step S15, the height of the cutter 200B of the second machining device 110 is set at the height of the machining tool calculated in Step S7. Thus, the spectacle lens 1 is sent to the second machining device 110 of which machining tool 200 is the cutter 200B, and the notched part 10B is machined to the spectacle lens 1 with the cutter 200B in Step S16.

Thereafter, similarly to the case that the type of the mounting part 10 is the closed-end hole 10A, it goes to Step S12. In Step S12, the spectacle lens 1 is returned to the original position by driving the horizontal displacement device 130A and the Z rotation device 150 of the lens feeder 130, and holding of the spectacle lens 1 by the lens holding device 140 is released in Step S13.

When the lens thickness is less than the above-described specified value in Step S6, since the closed-end hole 10A or the notched part 10B is not machined in the spectacle lens 1, it goes to Step S12. In Step S12, the spectacle lens 1 is returned to the original position by driving the horizontal displacement device 130A and the Z rotation device 150 of the lens feeder 130, and holding of the spectacle lens 1 by the lens holding device 140 is released in Step S13.

According to the present embodiment explained as above, it is possible to take a portion of the spectacle lens 1 for measuring the lens thickness by the lens thickness measuring device 70 to be as a mounting part-machined portion where the mounting part 10 is actually machined, even when the distance from the frame center FC to the edge face 4 of the spectacle lens 1 to which the mounting part 10 is to be machined differs from the accurate design distance and is a distance including errors due to occurrence of machining errors during edging of the raw material lens W by the edging device 40, because the distance between the frame center FC being the block center of the lens holding tool 40 during edging for manufacturing the spectacle lens from the raw material lens W and the edge face 4 of the spectacle lens 1 where the mounting part 10 is to be machined in the spectacle lens 1 is measured by the distance measuring device 50, and the fed amount of the spectacle lens 1 to the lens thickness measuring device 70 by the lens feeder 130 is based on the distance obtained by measurement using the distance measuring device 50, before machining the mounting part 10 for attaching the lugs 21, 31 and the bridge 22 which are the rimless spectacle frame components to the spectacle lens 1 by the drill 200A of the first machining device 90 and the cutter 200B of the second machining device 110 of the mounting part machining device 60.

Therefore, data on an accurate lens thickness at the mounting part machined portion are obtained. Accordingly, it becomes possible to machine the closed-end hole 10A or the notched part 10B which is the mounting part 10 by the first machining device 90 or the second machining device 110 for the spectacle lens 10 having the lens thickness equal to or larger than the specified value, and to dispose of the spectacle lens 1 without machining the close-end hole 10A or the notched part 10B for the lens 1 having the lens thickness less than the specified value.

Accordingly, by machining the closed-end hole 10A or the notched part 10B after confirming that the lens thickness at the mounting part machined portion where the closed-end hole 10A or the notched part 10B is to be machined is equal to or larger than the specified value, it is possible to attach the lugs 21, 31 and the bridge 22, which are the spectacle frame components on the spectacle lens 1 with a required strength.

In addition, according to the present embodiment, since the mounting part-machining device 60 shown in FIGS. 8 and 9 is provided with the first machining device 90 including the drill 200 and the second machining device 110 including the cutter 200B, it is possible to machine two kinds of the spectacle lens 1, that is, a spectacle lens to which the closed-end hole 10A is machined by the drill 200A and a spectacle lens to which the north part 10B is machined by the cutter 200B by using these first and second machining devices 90 and 110 appropriately. The attitude angles of these drill 200A and cutter 200B to the spectacle lens 1 are set to a certain fixed angle necessary to machine the closed-end hole 10A and the notched part 10B to the spectacle lens 1 as specified. Accordingly, there is no need to provide a lens attitude modification device in the lens feeder 130 for modifying the attitude of the spectacle lens 1 to feed it to the first machining device 90 and the second machining device 110. Therefore, it is possible to simplify the structures of whole devices and to reduce the manufacturing costs.

Furthermore, according to the present embodiment, the lens holding tool 41 for the edging device 40, the lens holding tool 51 for the distance measuring device 50, and the lens holding tool 141 for the lens feeder 130 are structured using the lens holder 42 which is used without being detached from the spectacle lens 1 as a component to be attached to the spectacle lens 1. Therefore, it is possible to perform measurement of the lens thickness, machining of the mounting part and the like at accurate positions because the block center of the lens holder 42 on the spectacle lens 1 is not changed when the spectacle lens 1 is installed to the edging device 40, the distance measuring device 50 and the lens feeder 130, so that the lens installation on these devices 40, 50 and 130 is accurately conducted using the position at which the lens holder 42 is attached to the spectacle lens 1 as the reference position.

The lens holder 42 is positioned in the rotational direction for the holder receptor 44 connected on the side of the rotation mechanism of the edging device 40, the holder receptor 54 connected on the side of the rotation mechanism of the distance measuring device 50, and the holder receptor 144 connected on the side of the rotation mechanism of the Z rotation device 150 disposed to the lens feeder 130 by the groove 42C, and the protrusions 44B, 54B, and 144B. Therefore, it is possible to establish an initial angle of rotation for the spectacle lens 1 in the respective edging device 40, distance measuring device 50, and lens feeder 130.

INDUSTRIAL AVAILABILITY

The present invention is applicable when machining the mounting part for installing components of a rimless spectacle frame to a spectacle lens.

The invention claimed is:

1. A spectacle lens measuring and machining device, comprising:
    a distance measuring device for measuring a distance between a frame center forming a block center in an edging for manufacturing the spectacle lens from a raw material lens and an edge face of said spectacle lens, including an error produced in said edging;
    a lens thickness measuring device for measuring the lens thickness at a mounting part-machined portion in the spectacle lens where the mounting part for mounting spectacle frame components is machined;
    a lens feeder for feeding the spectacle lens to the lens thickness measuring device;
    a machining device including a machining tool which advances from the edge face of said spectacle lens toward an inside of the lens, and for machining said mounting part to said spectacle lens with the machining tool;
    a controller for controlling said lens feeder and said machining device, to control feeding of said spectacle lens to said lens thickness measuring device by said lens feeder based on data on said distance which is inputted from said distance measuring device, and not to drive said machining device when data on said lens thickness is inputted from said lens thickness measuring device and the lens thickness found to be less than the specified value, and to drive the machining device when the lens thickness is equal to or larger than the specified value.

2. The spectacle lens measuring and machining device according to claim 1, wherein said lens feeder comprises a horizontal displacement device for displacing a spectacle lens having a fixed installation height in a horizontal direction, and a rotation device for rotating it around a vertical shaft.

3. The spectacle lens measuring and machining device according to claim 1, wherein said machining tool is a drill for forming a closed-end hole to be said mounting part from an edge face of said spectacle lens toward the inside of the lens within the thickness range of the spectacle lens.

4. The spectacle lens measuring and machining device according to claim 1, wherein said machining tool is a cutter for forming a notched part to be the mounting part from an edge face of the spectacle lens toward the inside of the lens, making an aperture at least on one surface side out of both lens surfaces of the spectacle lens.

5. The spectacle lens measuring and machining device according to claim 1, wherein said machining tools are plural in number and of different types, and said machining devices are provided for these respective machining tools.

6. The spectacle lens measuring and machining device according to claim 5, wherein said plural machining tools include a drill for forming a closed-end hole to be a mounting part from an edge face of the spectacle lens toward the inside of the lens within the thickness range of the spectacle lens, and a cutter for forming a notched part to be the above-described mounting part from an edge face of the spectacle lens toward the inside of the lens, making an aperture at least on one surface side out of both lens surfaces of the spectacle lens.

7. The spectacle lens measuring and machining device according to claim 1, wherein the attitude angles of said machining tools to said spectacle lens are set at a fixed angle and the height of the machining tools are set to be variable.

8. The spectacle lens measuring and machining device according to claim 7, wherein said controller controls said machining device based on data on said lens thickness from said lens thickness measuring device to modify the height of said machining tool.

9. The spectacle lens measuring and machining device according to claim 1, wherein the feeding of the spectacle lens to the lens thickness measuring device using the lens feeder under control of the above-described control device is performed based on the deviation amount of the actual frame center from the designed frame center, which is calculated based on the measured results of the above-described distance measuring device.

10. The spectacle lens measuring and machining device according to claim 1, wherein a lens holder for installing a raw material lens on said edging device is mounted at a position to be a frame center of an optical surface of said raw material lens, and is used for installing the spectacle lens on said distance measuring device and said lens feeder without being removed.

11. A method for measuring and machining a spectacle lens, comprising the steps of:
    edging for manufacturing the spectacle lens having a specified lens shape by edging a raw material lens taking a position to be a frame center as a block center;
    distance-measuring for measuring a distance between the frame center of the spectacle lens manufactured from the raw material lens by the edging step and an edge face of the spectacle lens;
    calculating a frame center deviation amount for calculating the position of an actual frame center based on the measured results by the distance measuring step to calculate a deviation amount of the actual frame center from a designed frame center;
    lens feeding for feeding the spectacle lens to a lens thickness measuring device for measuring the lens thickness at a mounting part-machined portion where the mounting part for installing spectacle frame components for the spectacle lens is to be machined, while correcting the deviation amount obtained in the frame center deviation amount calculating step;
    lens thickness measuring for measuring the lens thickness at the mounting part-machined portion of the spectacle lens with the lens thickness measuring device; and
    machining a mounting part for machining the mounting part in the spectacle lens with a machining tool when the lens thickness obtained by the lens thickness measuring step is equal to or larger than the specified value, and for not machining the mounting part in the spectacle lens with the machining tool when the lens thickness is less than the specified value.

12. A method for manufacturing a spectacle lens, comprising the steps of:
    edging for manufacturing the spectacle lens having a specified lens shape by edging a raw material lens taking a position to be a frame center as a block center;
    distance-measuring for measuring a distance between the frame center of the spectacle lens manufactured from the raw material lens by the edging step and an edge face of the spectacle lens;

calculating a frame center deviation amount for calculating the position of an actual frame center based on the measured results by the distance measuring step to calculate a deviation amount of the actual frame center from a designed frame center;

lens feeding for feeding the spectacle lens to a lens thickness measuring device for measuring the lens thickness at a mounting part-machined portion where the mounting part for installing spectacle frame components for the spectacle lens is to be machined, while correcting the deviation amount obtained in the frame center deviation amount calculating step;

lens thickness measuring for measuring the lens thickness at the mounting part-machined portion of the spectacle lens with the lens thickness measuring device; and machining a mounting part for machining said mounting part in said spectacle lens with a machining tool when the lens thickness obtained by the lens thickness measuring step is equal to or larger than the specified value.

13. A method for manufacturing spectacles, comprising the steps of:

edging for manufacturing the spectacle lens having a specified lens shape by edging a raw material lens taking a position to be a frame center as a block center;

distance-measuring for measuring a distance between the frame center of the spectacle lens manufactured from the raw material lens by the edging step and an edge face of the spectacle lens;

calculating a frame center deviation amount for calculating the position of an actual frame center based on the measured results by the distance measuring step to calculate a deviation amount of the actual frame center from a designed frame center;

lens feeding for feeding the spectacle lens to a lens thickness measuring device for measuring the lens thickness at a mounting part-machined portion where the mounting part for installing spectacle frame components for the spectacle lens is to be machined, while correcting the deviation amount obtained in the frame center deviation amount calculating step;

lens thickness measuring for measuring the lens thickness at the mounting part-machined portion of the spectacle lens with the lens thickness measuring device;

machining a mounting part for machining said mounting part in said spectacle lens with a machining tool when the lens thickness obtained by the lens thickness measuring step is equal to or larger than the specified value; and installing said spectacle frame components on said mounting part machined by the mounting part machining step.

* * * * *